United States Patent
Plumb et al.

(10) Patent No.: US 9,363,041 B2
(45) Date of Patent: Jun. 7, 2016

(54) WIRELESS POWER TRANSFER IN-BAND COMMUNICATION SYSTEM

(71) Applicants: William Plumb, Charlestown, MA (US);
Zhen Wang, Framingham, MA (US);
Zoran Zvonar, Boston, MA (US);
Patrick Stanley Riehl, Cambridge, MA (US); Anand Satyamoorthy, Somerville, MA (US); Philip Frank Tustin, North Andover, MA (US); MediaTek Singapore Pte. Ltd., Singapore (SG)

(72) Inventors: William Plumb, Charlestown, MA (US);
Zhen Wang, Framingham, MA (US);
Zoran Zvonar, Boston, MA (US);
Patrick Stanley Riehl, Cambridge, MA (US); Anand Satyamoorthy, Somerville, MA (US); Philip Frank Tustin, North Andover, MA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 0 days.

(21) Appl. No.: 14/356,607

(22) PCT Filed: Oct. 25, 2013

(86) PCT No.: PCT/US2013/066721
§ 371 (c)(1),
(2) Date: May 7, 2014

(87) PCT Pub. No.: WO2014/066707
PCT Pub. Date: May 1, 2014

(65) Prior Publication Data
US 2014/0314170 A1    Oct. 23, 2014

Related U.S. Application Data

(60) Provisional application No. 61/718,943, filed on Oct. 26, 2012.

(51) Int. Cl.
*H04L 27/10*   (2006.01)
*H04L 1/00*    (2006.01)
(Continued)

(52) U.S. Cl.
CPC ............ *H04L 1/0061* (2013.01); *H02J 7/025* (2013.01); *H04L 25/4904* (2013.01); *H04W 52/0261* (2013.01)

(58) Field of Classification Search
None
See application file for complete search history.

(56) References Cited

U.S. PATENT DOCUMENTS 6,782,300 B2 *   8/2004   Pillay .................. H04L 25/4904
                                                         375/333
6,851,086 B2 *   2/2005   Szymanski ........... H03M 13/09
                                                         714/781
(Continued)

OTHER PUBLICATIONS

"International Search Report" mailed on May 1, 2014 for International application No. PCT/US13/66721, International filing date:Oct. 25, 2013.

*Primary Examiner* — Chieh M Fan
*Assistant Examiner* — Wednel Cadeau
(74) *Attorney, Agent, or Firm* — Winston Hsu; Scott Margo

(57) ABSTRACT

A wireless charging in-band communication system includes a transmitter module that formats a message using CRC calculation and attaches the results of the CRC calculation to the message for message error detection. The transmitter includes channel encoding for message error correction. A modulation module performs biphase modulation for DC balanced signals and impedance switching to change reflected impedance seen by the source. A synchronization module prepending the message with a synchronization sequence having Golay complementary codes. Moreover, the in-band communication includes a receiver module that receives the message from the transmitter module. The receiver module includes an impedance sensing circuit to detect changes in the reflected impedance of the transmitter module. The receiver module includes a front end filter used for pulse shaping and noise rejection. A preamble detection block includes a Golay complementary code correlator used for message detection, synchronization, and equalization coefficient estimation and selection. A decoding module performs biphase demodulation with error correction with a DC offset being estimated as the average value of the signal over the length of the message before channel decoding Also, the decoding module performs equalization, error correction channel decoding,and error detection (CRC).

55 Claims, 27 Drawing Sheets

(51) Int. Cl.
*H04W 52/02* (2009.01)
*H04L 25/49* (2006.01)
*H02J 7/02* (2016.01)

(56) References Cited

U.S. PATENT DOCUMENTS 8,208,577 B2    6/2012  Calvin

2011/0031928 A1    2/2011  Soar
2012/0033714 A1*   2/2012  Lakkis ............... H04B 1/71632
                                                375/147
2012/0161539 A1*   6/2012  Kim ........................ H02J 17/00
                                                307/104
2012/0293118 A1   11/2012  Kim

* cited by examiner

| Barker code | | | | | | | | | | | | | Comment |
|---|---|---|---|---|---|---|---|---|---|---|---|---|---|
| +1 | +1 | +1 | +1 | +1 | -1 | -1 | +1 | +1 | -1 | +1 | -1 | +1 | 13 bit Barker code |
| -1 | -1 | -1 | -1 | -1 | +1 | +1 | -1 | -1 | +1 | -1 | +1 | -1 | Inverted 13 bit barker code |

| SNR | Correction detection | False detection | Total number | Comment |
|---|---|---|---|---|
| -10 | 89686 | 372431 | 100000 | |
| -9 | 93725 | 182211 | 100000 | |
| -8 | 96451 | 72730 | 100000 | |
| -7 | 98160 | 21942 | 100000 | |
| -6 | 99172 | 5029 | 100000 | |
| -5 | 99629 | 787 | 100000 | |
| -4 | 99848 | 83 | 100000 | |
| -3 | 99946 | 4 | 100000 | |
| -2 | 99989 | 1 | 100000 | |
| -1 | 99998 | 0 | 100000 | |
| 0 | 100000 | 0 | 100000 | |
| 1 | 100000 | 0 | 100000 | |
| 2 | 100000 | 0 | 100000 | |

FIG. 20

| SNR | Correction detection | False detection | Total number | Comment |
|---|---|---|---|---|
| -10 | 94566 | 451 | 100000 | 4xsample rate, AWGN channel, using matched filter |
| -9 | 95989 | 46 | 100000 | |
| -8 | 97233 | 3 | 100000 | |
| -7 | 98320 | 1 | 100000 | |
| -6 | 98926 | 0 | 100000 | |
| -5 | 99416 | 0 | 100000 | |
| -4 | 99712 | 0 | 100000 | |
| -3 | 99884 | 0 | 100000 | |
| -2 | 99947 | 0 | 100000 | |
| -1 | 99981 | 0 | 100000 | |
| 0 | 99994 | 0 | 100000 | |

FIG. 22

| 2x8 bit Golay complementary code | | | | | | | |
|---|---|---|---|---|---|---|---|
| +1 | -1 | +1 | +1 | -1 | +1 | +1 | +1 |
| -1 | +1 | -1 | -1 | -1 | +1 | +1 | +1 |

FIG. 23

| (HB_2n+1, HB_2n) > 0 | HB_2n >= HB_2n+1 | HB_2n | HB_2n + 1 |
|---|---|---|---|
| 0 | 0 | 1 | -1 |
| 0 | 1 | -1 | 1 |
| 1 | 0 | -1 | 1 |
| 1 | 1 | 1 | -1 |

```
for(index=2;index<length;index=index+1)
{
    if((Sample[index]<0)&&(Sample[index-1]<0))
    {
        if(Sample[index-1]>= Sample[index])
        {
            Sample[index-1]= -1*Sample[index-1];
        }
        else
        {
            Sample[index]= -1*Sample[index];
        }
    }
    else if((Sample[index]>0)&&(Sample[index-1]>0))
    {
        if(Sample[index-1]>= Sample[index])
        {
            Sample[index-1]= -1*Sample[index-1];
        }
        else
        {
            Sample[index]= -1*Sample[index];
        }
    }
    if((Sample[index-2]>0)&&(Sample[index-1]<=0)||
       (Sample[index-1]>0)&&(Sample[index-2]<=0))
    {
        Bit='1';
    }
    else
    {
        Bit='0';
    }
}
```

FIG. 30

| Steps for biphase decoding with error correction |
|---|
| 1. Samples for each half bit are accumulated |
| 2. The first halfbit of each bit ($HB_{2n+1}$) is compared in magnitude to the previous halfbit ($HB_{2n}$) - i.e. last halfbit in the previous bit |
| 3. If ($HB_{2n}$ >= $HB_{2n+1}$)<br>    $HB_{2n+1}$ = -1*$HB_{2n}$ |
| 4. If ($HB_{2n}$ < $HB_{2n+1}$)<br>    $HB_{2n+1}$ = -1*$HB_{2n}$ |
| 5. Decode biphase signal as usual if a transition occurs at the half bit period then the bit is a '1' otherwise the bit is a '0'<br>If [(($HB_{2n-1}$>0) and ($HB_{2n}$<=0)] or [($HB_{2n-1}$<=0) and ($HB_{2n}$>0)]<br>    Bit='1'<br>If [(($HB_{2n-1}$>0) and ($HB_{2n}$>0)] or [($HB_{2n-1}$<=0) and ($HB_{2n}$<=0)]<br>    Bit='0' |

FIG. 31

WIRELESS POWER TRANSFER IN-BAND COMMUNICATION SYSTEM

PRIORITY INFORMATION

This application claims priority from provisional application Ser. No. 61/718,943 filed Oct. 26, 2012, which is incorporated herein by reference in its entirety.

BACKGROUND OF THE INVENTION

The invention is related to the field of wireless power transfer systems, and in particular a wireless power transfer in-band communication system that provides robust communications channel to be embedded in the case where energy is transferred from a Source to a Load without a physical connection.

Current wireless power transfer (also referred to as wireless charging) on the market (Qi) employs communication system based on a classic asynchronous serial communication interface with a start/stop bit or indication and little or no protection on the data transmitted. This serial communication is specified by the Wireless Power Consortium (WPC).

SUMMARY OF THE INVENTION

According to one aspect of the invention, there is provided a wireless charging in-band communication system. The in-band communication includes a transmitter module that formats a message using CRC calculation and attaches the results of the CRC calculation to the message for message error detection. The transmitter includes channel encoding for message error correction. A modulation module performs biphase modulation for DC balanced signals and impedance switching to change reflected impedance seen by the source. A synchronization module prepending the message with a synchronization sequence having Golay complementary codes. Moreover, the in-band communication includes a receiver module that receives the message from the transmitter module. The receiver module includes an impedance sensing circuit to detect changes in the reflected impedance of the transmitter module. The receiver module includes a front end filter used for pulse shaping and noise rejection. A preamble detection block includes a Golay complementary code correlator used for message detection, synchronization, and equalization coefficient estimation and selection. A decoding module performs biphase demodulation with error correction with a DC offset being estimated as the average value of the signal over the length of the message before channel decoding Also, the decoding module performs equalization, error correction channel decoding, and error detection (CRC).

According to another aspect of the invention, there is provided a method of performing the operations of a wireless charging in-band communication system. The method includes formatting a message using CRC calculation and attach the results of the CRC calculation to the message for message error detection, and performing biphase modulation for DC balanced signals using a modulation module. A synchronization module prepends the message with a synchronization sequence having Golay complementary codes. A receiver module receives the message from the transmitter module using a receiver module. The method includes providing an impedance sensing circuit to detect changes in the reflected impedance of the transmitter module, and providing a front end filter used for pulse shaping and noise rejection. Moreover, the method includes using a Golay complementary code correlator used for message detection, synchronization, and equalization coefficient estimation and selection, and performing biphase demodulation with error correction with a DC offset being estimated as the average value of the signal over the length of the message before channel decoding using a biphase demodulator module. Furthermore, the method includes performing equalization, error correction channel decoding, and error detection (CRC).

BRIEF DESCRIPTION OF THE DRAWINGS

FIG. 20 is a table illustrating the Barker code preamble performance with AWGN channel;

FIG. 22 is a table illustrating the Hadamard code preamble performance with AWGN channel;

FIG. 23 is a table illustrating the 2×8 bit Golay complementary sequence;

FIG. 30 is the maximum likelihood biphase demodulation pseudo code;

FIG. 31 is a table illustrating the steps for biphase decoding with error correction and DC offset compensation;

DETAILED DESCRIPTION OF THE INVENTION

This invention describes the feasibility of using the wireless power transfer medium to send messages from a charging device to the source. Wireless power transfer (also referred to as wireless charging) is when energy is transferred from a Source to a Load without a physical connection. A typical example in this case would be a pad that's sits on a flat surface acting as the Source and a mobile phone placed on or near the pad acting as the Load.

Figure 1:
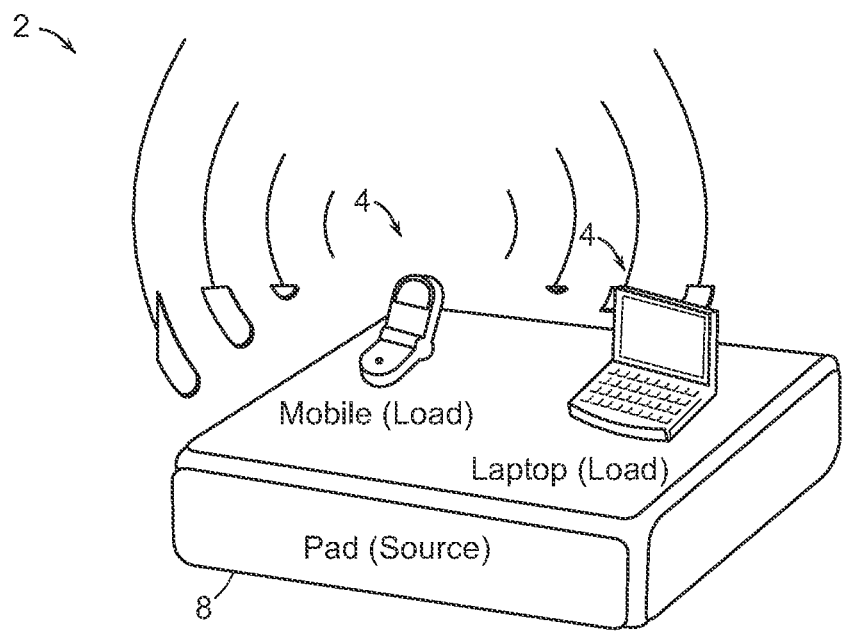
FIG. 1 is a schematic diagram illustrating the charger system.

FIG. 1 shows a wireless power transfer system that includes an in-band communication system 2. In-band communication system 2 has the benefit of being a lower cost solution compared to out-of-band solution. In-band communication allows: (1) Foreign object detection; (2) Power matched to load (vs. full TX power); (3) Power allocation per load; (4) Charger status available on phone; and (5) provisioning/billing. Current wireless power transfer (also referred to as wireless charging) on the market (Qi) employs communication system based on a classic serial communication interface with a start/stop bit or indication and little or no protection on the data transmitted. This serial communication is specified by the Wireless Power Consortium (WPC).

Figure 2:
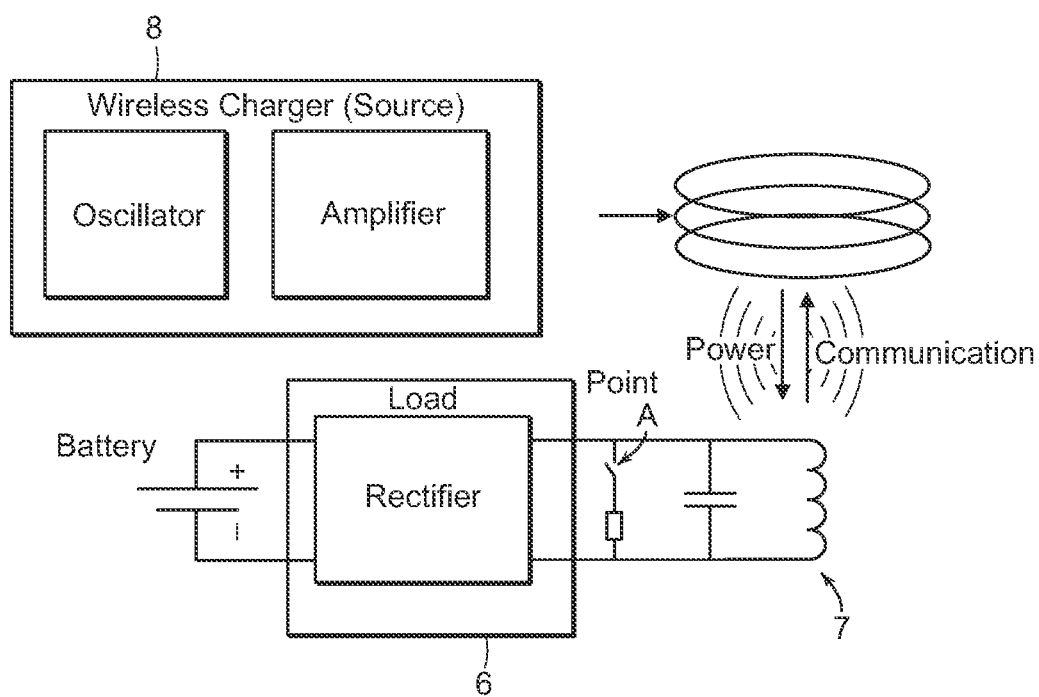
FIG. 2 is a schematic diagram illustrating the impedance variation for load to source communications.
Figure 3:
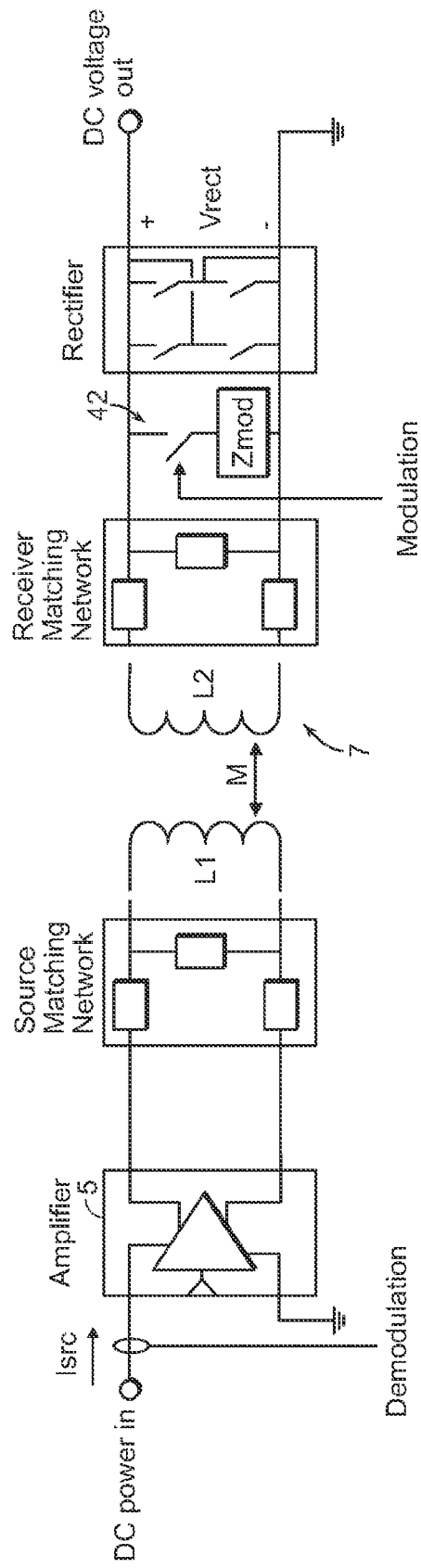
FIG. 3 is a schematic diagram illustrating a wireless power system with load modulation used in accordance with the invention

The inventive wireless power transfer in-band communication system is different from systems currently on the market or proposed by other companies. In this topology the Load device 4 is required to communicate with the Source to provide power control commands, status and foreign object detection information. It is possible by varying the reflected impedance of the Load 4 seen by the Source to modulate a signal on the transmitted power waveform to facilitate communication between the Load and Source. FIG. 2 shows how the Load impedance 6 can be varied (Point A) to modulate the transmitted signal at the Source 8. The modulation component can be either capacitive or resistive. FIG. 3 shows a block diagram representation of load modulation.

Figure 4:
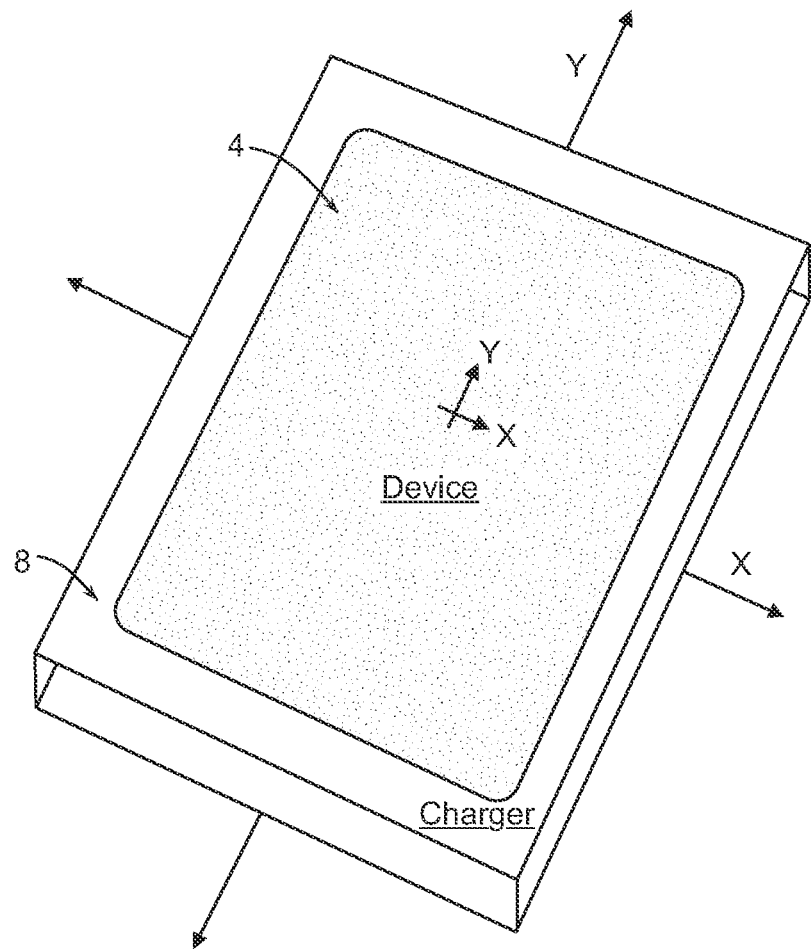
FIG. 4 is a schematic diagram illustrating a charger and device orientation of current available wireless charging topologies.

Note that inductive wireless charging setups require that the device (Load) 4 is sitting flush with the charger Source 8, as shown in FIG. 4. For wireless charging to occur the device can only have a limited number of orientations. Both the close proximity and fixed orientation results in very benign wireless charger communication channel conditions—thus allowing a simple communications scheme The inventive wireless charging system can utilize a larger form factor to allow multiple devices to charge simultaneously. The inventive wireless charging system can have multiple devices with arbitrary orientation. The devices do not need to be in close proximity or have a fixed orientation.

The arbitrary offset and position of the device results in very hostile in-band wireless charger communication channel conditions. This makes communication between Load and Source difficult.

The in-band communication system used by the invention must have low complexity and be robust enough to ensure good communication between the Load(Transmitter) and the Source(Receiver). Complexity is an important factor as both the communication transmission and reception must be able to be implemented on relatively simple MCUs and/or low complexity dedicated hardware.

Figure 5:
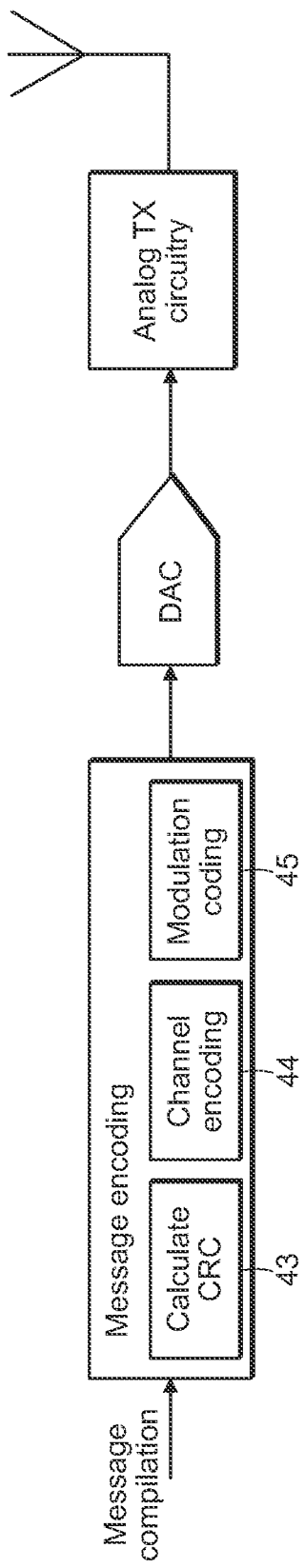
FIG. 5 is a schematic block diagram of the TX communication path used in accordance with the invention.

FIG. 5 shows the transmit portion of the in-band communication system includes: (1) Message formatting; (2) CRC calculation and attachment to message, for message error detection—43; (3) Channel encoding—BCH error correction encoder—44; (4) Modulation—biphase modulation for DC balanced signal—45; (5) Prepend message with synchronization sequence—Golay complementary code; (6) A wireless charging receiver coil used to convert energy in an electromagnetic field to electrical energy—7, as show in FIG. 2 and FIG. 3; (7) Active switching of a passive component—either resistive or capacitive—to change the reflected impedance of the Load seen by the Source—as shown in FIG. 2 as point A, and Zmod 42 of FIG. 3.

Figure 6:
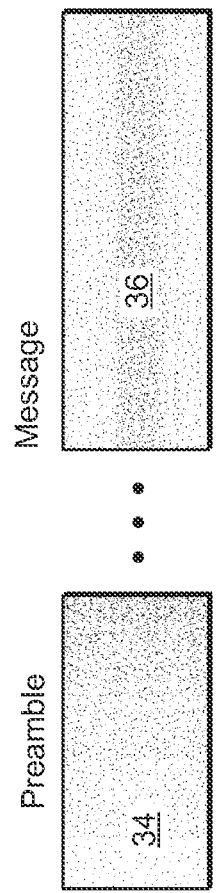
FIG. 6 is a schematic diagram illustrating the preamble/message sequence used in accordance with the invention.
Figure 7:
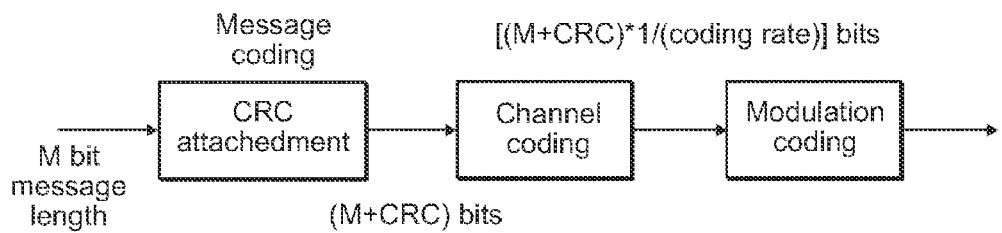
FIG. 7 is a schematic diagram illustrating the transmitter message encoding used in accordance with the invention

FIG. 6 shows the preamble 34 followed by the message 36 and FIG. 7 shows how the message is constructed before transmitting. Note that a gap between the preamble and message maybe used to allow timing adjustments done by the synchronization block in the receiver to take effect at the output of the digital front end filter in time for the message to be received.

Table 1 shows some typical values for the message encoding/decoding.

TABLE 1

| Message coding element | Size/length |
| --- | --- |
| M message length | ~8-200 bits |
| CRC | 8 bits |
| Channel coding rate | BCH (15.7) or Hamming (13.8) |
| Modulation coding | Biphase modulation rate = 4 kHz |

The CRC is used to determine if the message is received without errors. The CRC shall be attached to each message header—if used—and message body. Note that for a variable length communications system the header must indicate the length of the message and must also have a CRC attached to allow for the determination of correct detection. An eight bit CRC could be used with the following polynomial: poly(D)= $D^8+D^7+D^4+D^3+D+1$.

Two error correcting codes have been considered for the wireless charger application but the invention can use other known coding technologies. The first code is a (15,7) double-error-correcting BCH code and the second code is an enhanced (13,8) Hamming code which can correct single-bit errors as well as adjacent double-bit errors. For both codes, an implementation of the encoder and the straightforward implementation of the decoder based on lookup tables is used.

The following describes a possible encoder implementation of a (15,7) double-error-correcting BCH Code. A codeword can be written as c=($c_1, c_2, \ldots, c_{15}$), where $c_1, c_2, \ldots, c_7$ are information bits and $c_8, c_9, \ldots, c_{15}$ are redundant bits. The parity check matrix of the code is $$H = \begin{bmatrix} 1 & 1 & 0 & 1 & 0 & 0 & 0 & 1 & 0 & 0 & 0 & 0 & 0 & 0 & 0 \\ 0 & 1 & 1 & 0 & 1 & 0 & 0 & 0 & 1 & 0 & 0 & 0 & 0 & 0 & 0 \\ 0 & 0 & 1 & 1 & 0 & 1 & 0 & 0 & 0 & 1 & 0 & 0 & 0 & 0 & 0 \\ 0 & 0 & 0 & 1 & 1 & 0 & 1 & 0 & 0 & 0 & 1 & 0 & 0 & 0 & 0 \\ 1 & 1 & 0 & 1 & 1 & 1 & 0 & 0 & 0 & 0 & 0 & 1 & 0 & 0 & 0 \\ 0 & 1 & 1 & 0 & 1 & 1 & 1 & 0 & 0 & 0 & 0 & 0 & 1 & 0 & 0 \\ 1 & 1 & 1 & 0 & 0 & 1 & 1 & 0 & 0 & 0 & 0 & 0 & 0 & 1 & 0 \\ 1 & 0 & 1 & 0 & 0 & 0 & 1 & 0 & 0 & 0 & 0 & 0 & 0 & 0 & 1 \end{bmatrix}$$

The generator matrix of the code is $$G = \begin{bmatrix} 1 & 0 & 0 & 0 & 0 & 0 & 0 & 1 & 0 & 0 & 1 & 0 & 1 & 1 \\ 0 & 1 & 0 & 0 & 0 & 0 & 0 & 1 & 1 & 0 & 0 & 1 & 1 & 1 & 0 \\ 0 & 0 & 1 & 0 & 0 & 0 & 0 & 0 & 1 & 1 & 0 & 0 & 1 & 1 & 1 \\ 0 & 0 & 0 & 1 & 0 & 0 & 0 & 1 & 0 & 1 & 1 & 1 & 0 & 0 & 0 \\ 0 & 0 & 0 & 0 & 1 & 0 & 0 & 0 & 1 & 0 & 1 & 1 & 1 & 0 & 0 \\ 0 & 0 & 0 & 0 & 0 & 1 & 0 & 0 & 0 & 1 & 0 & 1 & 1 & 1 & 0 \\ 0 & 0 & 0 & 0 & 0 & 0 & 1 & 0 & 0 & 0 & 1 & 0 & 1 & 1 & 1 \end{bmatrix}$$

The code can correct any double-bit errors. To simplify the error correcting algorithm, the error will be corrected only if the information bits of the codes are affected.

Given 7 information bits v, for encoding the 15-bit codeword can be computed by a modulo 2 matrix multiplication c=vG. The formulas for the 8 redundant bits are as follows, where + is the modulo 2 addition.

$c_8 = c_1 + c_2 + c_4$ $c_9 = c_2 + c_3 + c_5$ $c_{10} = c_3 + c_4 + c_6$ $c_{11} = c_4 + c_5 + c_7$ $c_{12} = c_1 + c_2 + c_4 + c_5 + c_6$ $c_{13} = c_2 + c_3 + c_5 + c_6 + c_7$ $c_{14} = c_1 + c_2 + c_5 + c_6 + c_7$ $c_{15} = c_2 + c_3 + c_7$

The following describes a possible encoder implementation of a (13,8) Enhanced Hamming code. The (13,8) Enhanced Hamming code can correct any single-bit errors and any adjacent double-bit errors. The total number of correctable error patterns is 26. For channel models where almost all of the double-bit errors occur to two adjacent bits, the code can provide nearly as good performance as a double-error-correcting BCH codes.

Given 8 information bits v, the 13-bit codeword can be computed by a modulo 2 matrix multiplication c=vG. The formulas for the 5 redundant bits are as follows, where + is the modulo 2 addition.

$c_9 = c_2 + c_3 + c_5 + c_7$ $c_{10} = c_1 + c_3 + c_4 + c_6$ $c_{11} = c_1 + c_2 + c_5 + c_8$ $c_{12} = c_1 + c_2 + c_3 + c_5 + c_6$ $c_{13} = c_2 + c_4 + c_7 + c_8$

Specific consideration has been given to the modulation format. This is important for multiple reasons: to have suitable format for the medium that is dominated by large DC signals, to have good performance in terms of bit-error-rate (BER) and to have format that can be effectively produced by simple circuit realization.

Figure 8:
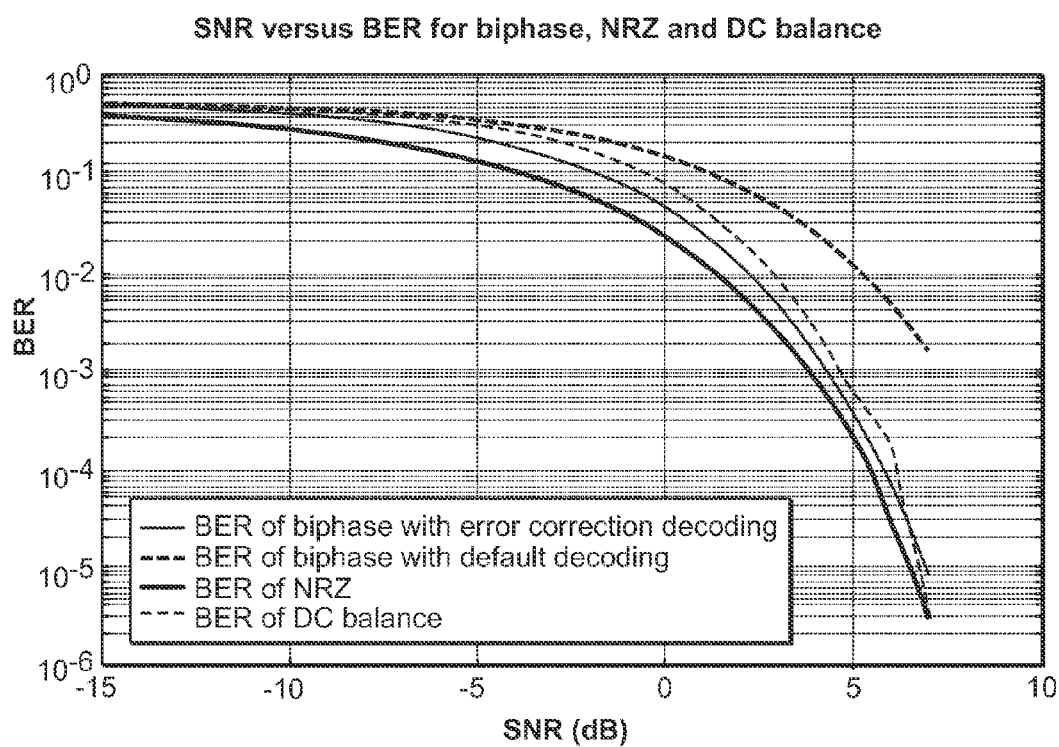
FIG. 8 is a graph illustrating the BER versus SNR for modulation coding methods.

FIG. 8 shows the BER performance of the different methods compared to the Non-Return Zero (NRZ) case with normalized throughput rates. From FIG. 8, it can be seen that the biphase modulation with error correction has slightly better performance than the DC balanced method. However it should be noted that there are a number of consecutive ones (up to 4) in the DC balanced code which is in violation of the number of consecutive "1"s that can be tolerated by the system.

In-band communication is accomplished by means of modulating the impedance of a Load and sensing a power change on the Source. One can detect this power change on the Source via a sensing circuit and provide this as an input to a micro-controller or low complexity hardware block. During communications, a "0" output from the "Load" has no effect on the "Source" coil's impedance. The impedance modulation may have the effect of decreasing the power available to the Load. In order to maintain a relatively constant rate of power transfer the coding scheme should have a relative consistent portion of "1"s and "0"s.

Figures 28, 29:
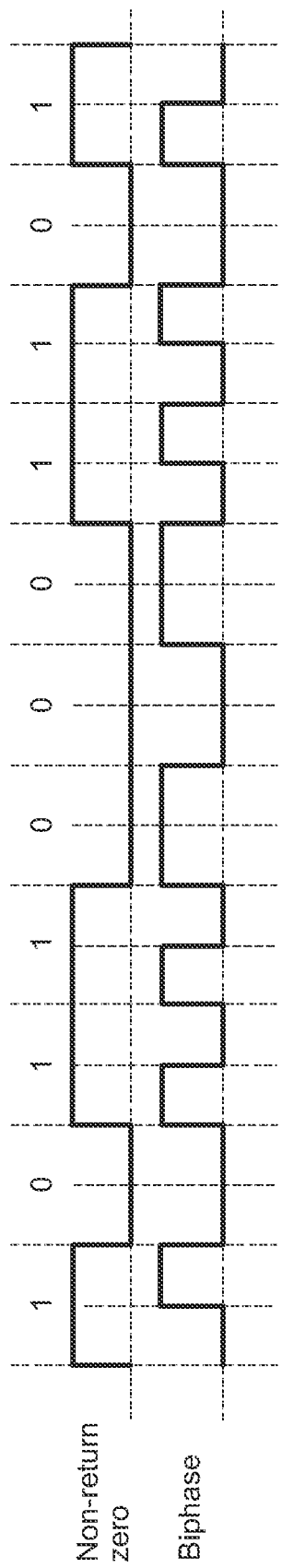
FIG. 28 is a graph illustrating a biphase encoded signal.
FIG. 29 is a table illustrating the maximum likelihood biphase demodulation.

A transmission protocol such as biphase insures that a "1" state will only occur for one bit time before it will be normalized by a "0" state. This type of conditioning is best for the circuitry to minimize the effect on the "receivers" coil voltage. At worst only three consecutive "1"s should occur at the biphase rate (in the example of the system used to illustrate operation rate is 4 kHz). Due to this issue the DC balanced modulation 8b10b scheme investigated is not suitable for this application. Run length limited (RLL) codes were also investigated however due to the limitation on the number of consecutive ones the RLL codes had comparable performance to that of the biphase encoding. The modulation method recommended is biphase with error correction. FIG. 28 shows an example of a biphase encoded signal. The signal has a change of level at the boundary of every symbol. A binary "1" has a change of level in the middle of every symbol and a "0" maintains its level for the duration of a symbol.

The receiver portion of the in-band communication system includes: (1) Impedance sensing, to detect changes in the reflected impedance of the TD; (2) Front end filter, used for pulse shaping and noise rejection; (3) Preamble detection block—Golay complementary code correlator, used for message detection, synchronization, and equalization coefficient estimation; (4) Demodulation and equalization—biphase demodulation with error correction; (5) Channel decoding—BCH error correction decoder; (6) CRC calculation, check and removal, for message error detection.

Figure 9:
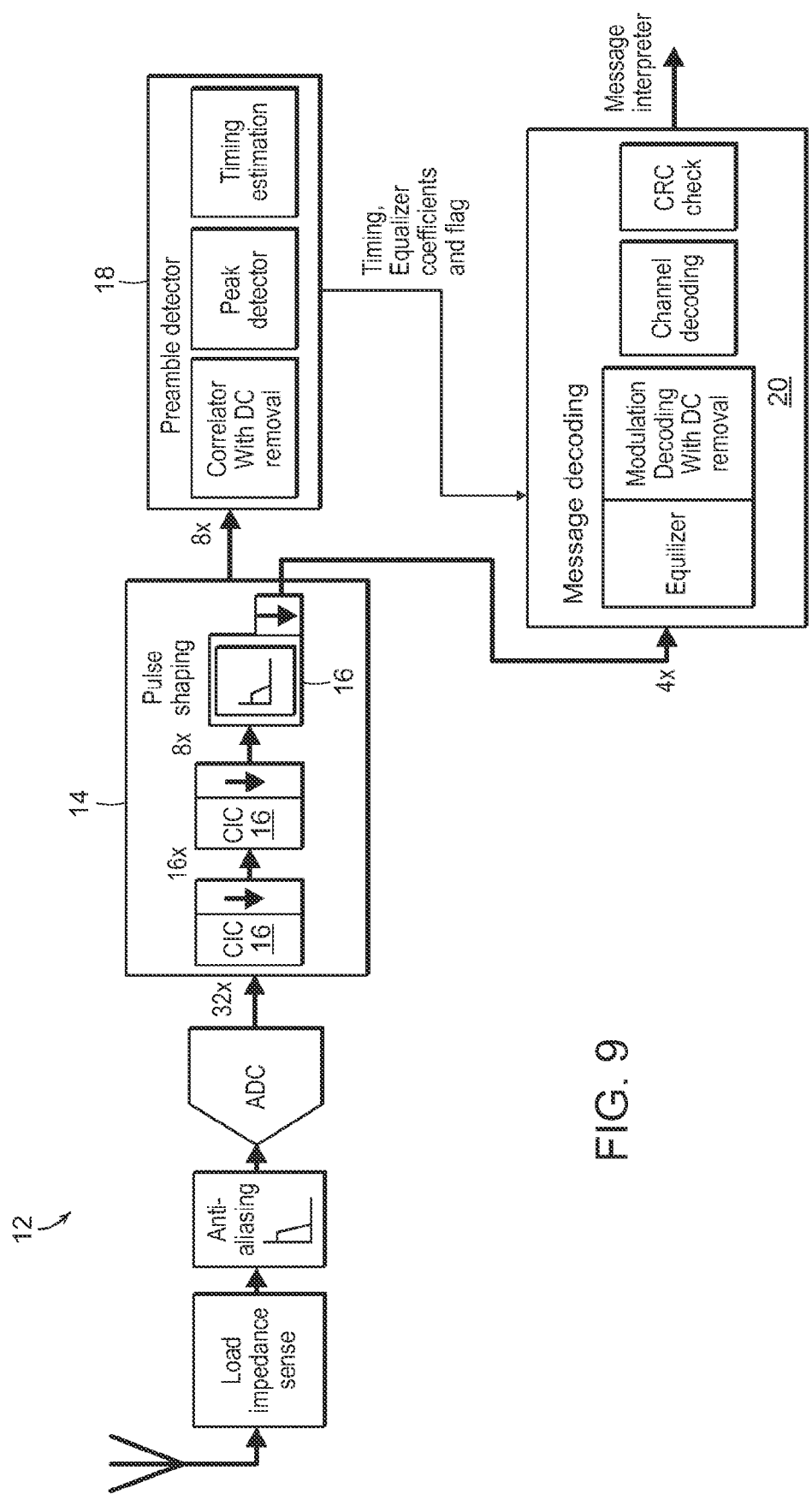
FIG. 9 is a schematic diagram illustrating the RX communication path used in accordance with the invention.
Figure 10:
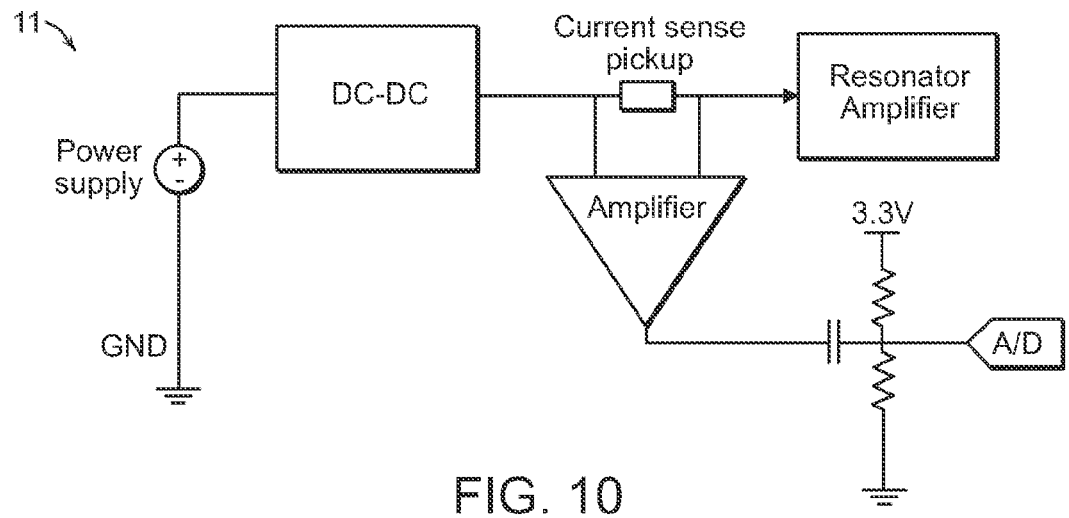
FIG. 10 is a schematic diagram illustrating load impedance sense circuit used in accordance with the invention.

FIG. 9 shows a block diagram of the in-band communications receiver 12. The front end includes load impedance sensing module followed by analog anti-aliasing filter and the analog-to-digital converter (ADC). FIG. 10 shows an exemplary embodiment of a Load impedance sense circuit 11 used in accordance circuit. This circuit 11 includes a current sense for load sensing that coupled to an amplifier and resonator amplifier 5, as shown in FIG. 3.

ADC typically operates at the clock rate that is an integer multiple of the data rate supported by in-band communication system. In one of the implementations of the receiver the received signal after ADC is 32x oversampled, with x being the supported data rate, and is down sampled digitally. The sample rate of the signal after downsampling is dependent on the signal processing function being used. For preamble detection the rate of oversampling used can 8x or 4x and for message reception the oversampling rate is 4x. A higher oversample rate used in the preamble detection results inbetter noise and DC offset estimation.

Figure 11:
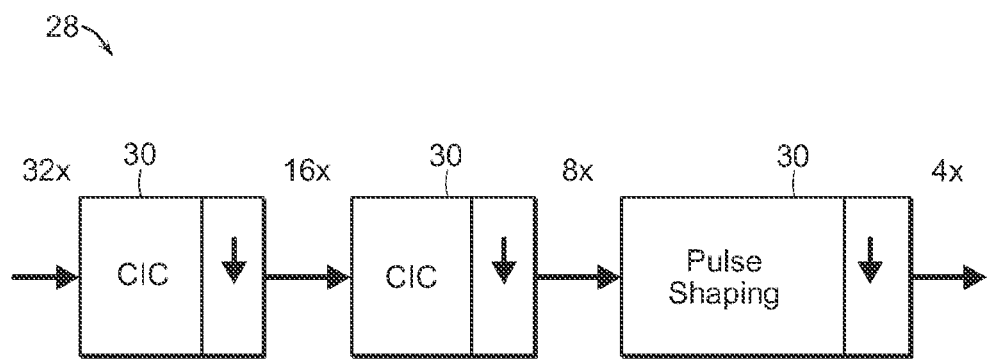
FIG. 11 is a schematic diagram illustrating an example of a cascade of filter sections.

Following ADC is the digital RX front end filter 14 which can be implemented as a cascade of the filter sections 16 to reduce the amount of processing (MIPS) and increase the number of effective bits. The output of the pulse shaping filter is down sampled to the rate required by the preamble and message detection. In the current design the message detection has an input sample rate of 4x rate. The selection of which samples to filter is determined by the synchronization procedure. It should be noted that the pulse shaping filter could be implemented as a cascade of filter sections to reduce the amount of processing (MIPS) required. FIG. 11 shows an example of how the pulse shaping filter 28 could be broken into sections 30.

Figure 12:
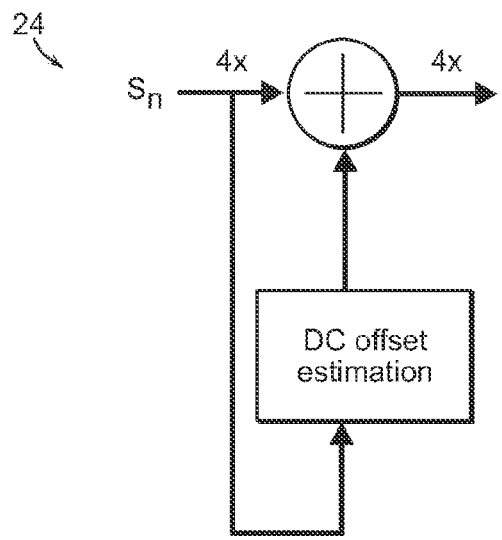
FIG. 12 is a schematic diagram illustrating DC removal block used in accordance with the invention.

The received signal is a combination of wanted biphase modulated signal and unwanted DC offset. The DC offset can be removed within one of the following modules Analog front-end pulse shaping filter or within synchronization and demodulation modules, or at several modules concurrently. It can be done as a separate DC offset removal block 24 shown in FIG. 12. Whether to use a separate DC offset removal or not is a design trade off. For example a course DC offset removal could be done by the analog front end and a fine DC offset done as part of the preamble detector (synchronization) and demodulation block. FIG. 9 shows a block diagram of the front end filters 16 where the DC offset removal is done as part of the preamble detector 18 and the demodulation block 20 using DC block removal block 24, FIG. 12.

Figure 13:
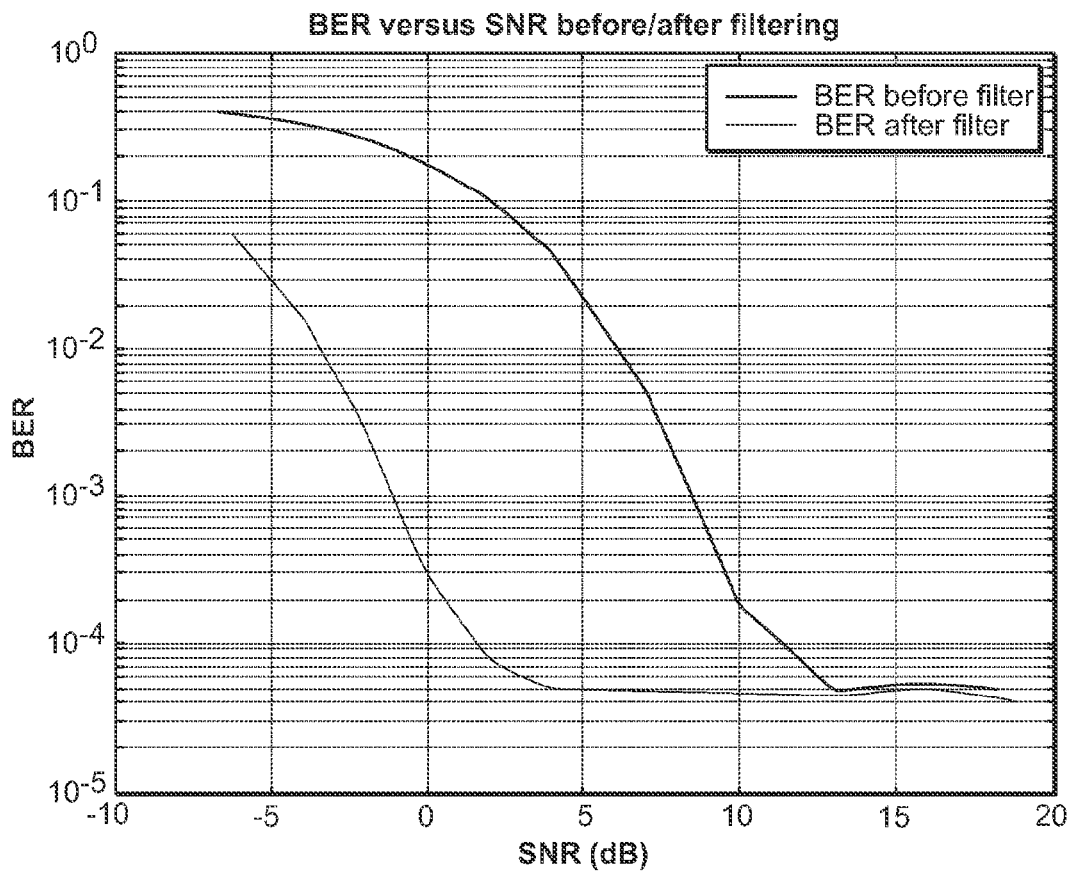
FIG. 13 is a graph illustrating the BER versus SNR for biphase signal before and after pulse shaping filtering with no channel coding.
Figure 14:
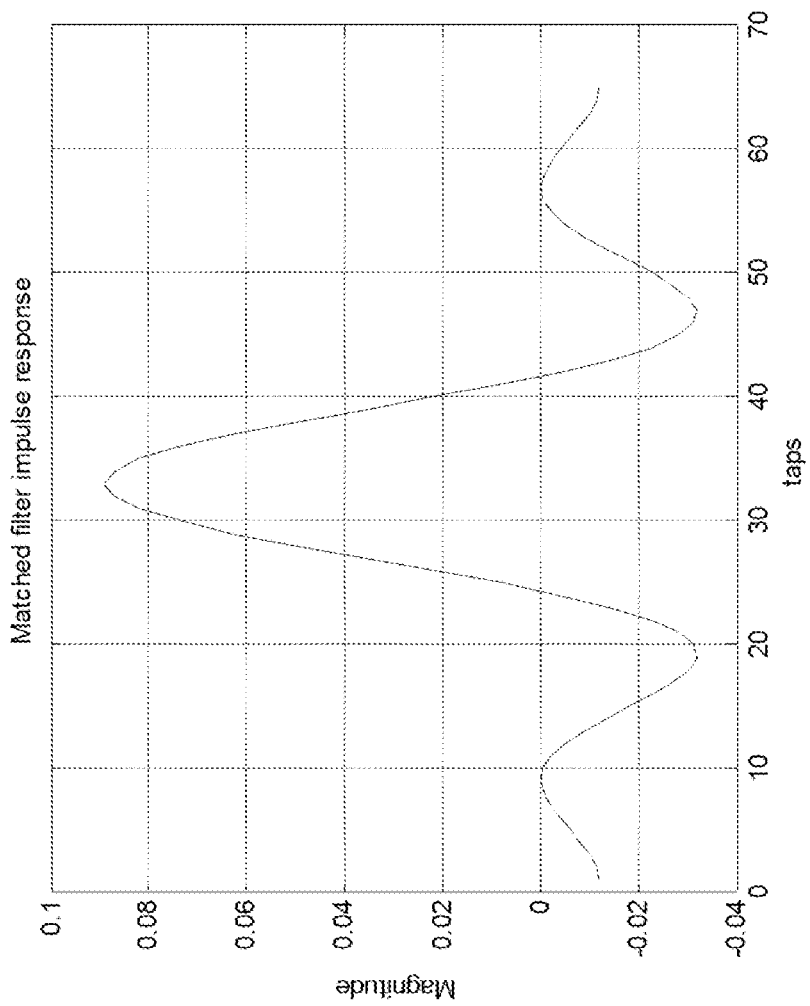
FIG. 14 is a graph illustrating the impulse response of the floating point pulse shaping filter.

The following pulse shaping filter was designed to remove the DC offset and attenuate the signal past the first main lobe of the biphase signal. FIG. 13 shows an example of the improvement in the performance when using the pulse shaping filter. FIG. 13 also shows there is a noise floor due to the distortion of the signal within the inband region. FIG. 14 shows the impulse response of the pulse shaping filter.

The preamble detector 18 (or synchronization) block contains: (1) Correlator with DC offset; (2) Peak detector; and (3) Timing estimation. The correlator can be done as either a sliding correlator or using the Enhanced Golay Correlator (EGC).

Figure 15:
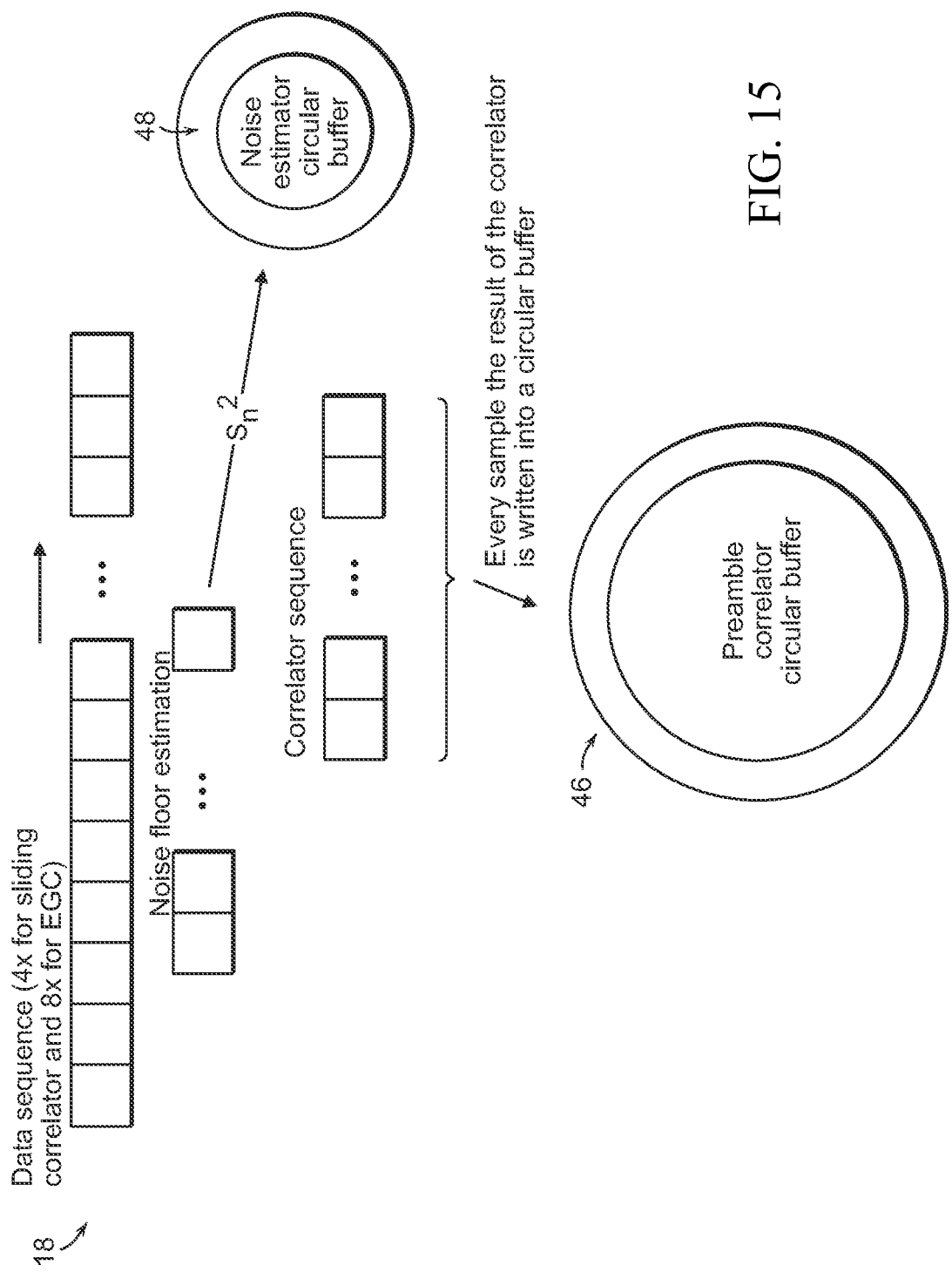
FIG. 15 is a schematic diagram illustrating the preamble correlator operation used in accordance with the invention.
Figure 16:
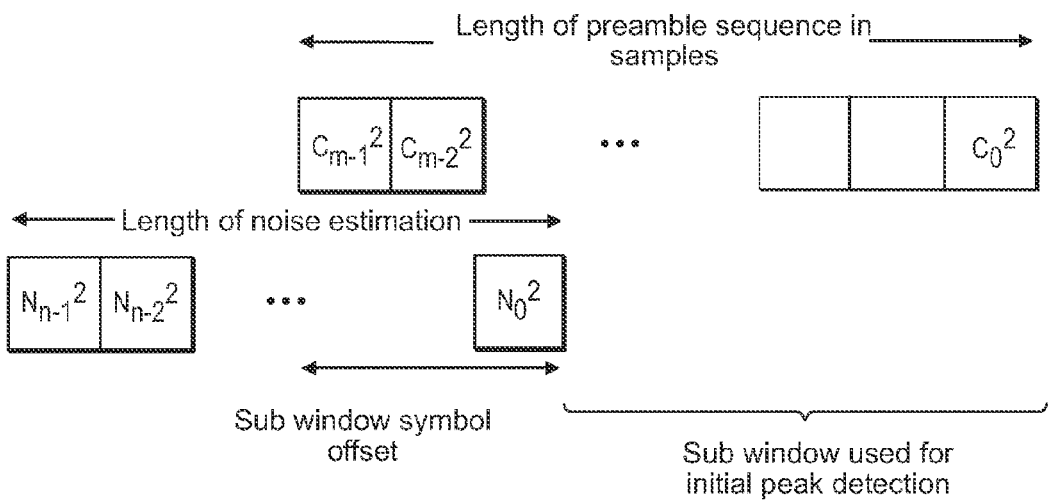
FIG. 16 is a schematic diagram illustrating the preamble peak detector used in accordance with the invention.
Figure 17:
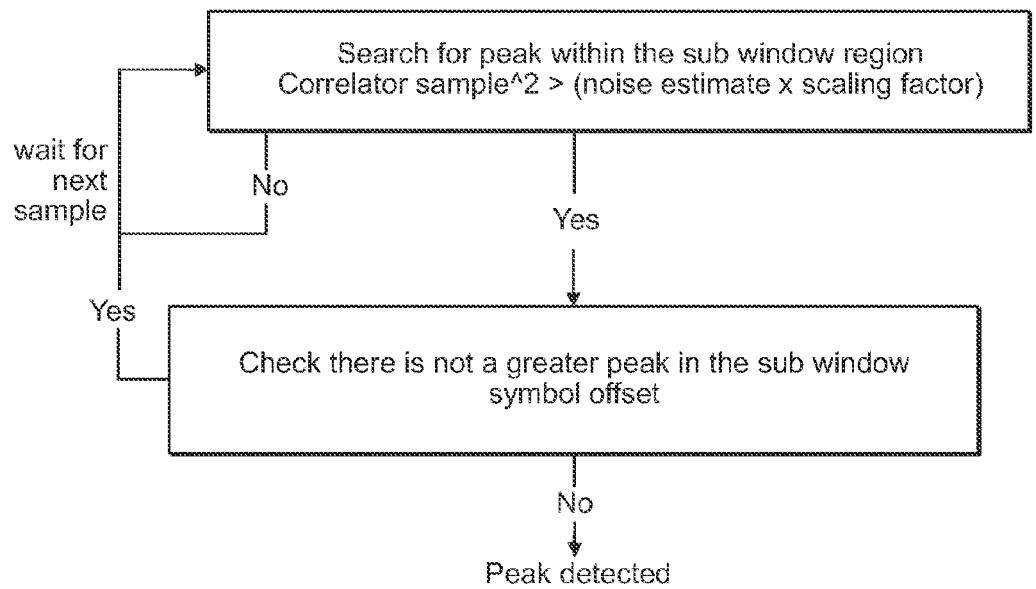
FIG. 17 is a flow chart illustrating exemplary peak detection algorithm used in accordance with the invention.

FIG. 15 shows a block diagram of the preamble correlator operating on the input data sequence. Every sample the correlator outputs a result and loads it into a circulator buffer 46 or a noise estimator circular buffer 48. FIG. 16 shows a diagram with the correlator 46 and noise circular buffer 48 in a linear topology. Note that the noise estimation is a moving average filter which should be set to at least the length of the correlator sequence m. Using a power of two will simplify the code implementation and negate the use of a divide operation. The samples used for the noise estimation $[N_0^2 \ldots N_{n-1}^2]$ should be taken before the sub window used for initial peak detection. FIG. 17 shows the flow chart of one possible implementation used to perform the peak detection.

In order for the Source(Receiver) to determine if the Load (Transmitter) is transmitting a message there needs to be an initial preamble for the Source to do the following: (1) Recognize there is going to be a message transmitted from the Load to the Source; (2) Synchronization of the symbol timing between the Load and the Source by setting which samples are feed into the pulse shaping filter; and (3) Calculation of equalizer coefficients and hence dispersiveness of the channel.

The Load system will have its frequency locked to the Source 6.78 MHz oscillator so the preamble synchronization sequence is only meant for the Source to determine the symbol timing.

FIG. 6 shows an example of a preamble/message sequence. Each message 36 should be accompanied with a preamble sequence 34. The preamble sequence 34 should have the following characteristics: (1) Short length; and (2) Good auto correlation characteristics.

The following codes were investigated: (1) Barker sequence; (2) Complementary Hadamard sequence, (3) length 32; M-sequence length, 32; (4) Complementary Golay sequence, length 16. Note other codes can also be used in accordance with the invention.

Of these synchronization codes investigated the Complementary Golay sequence had good characteristics and also the option of implementing the correlator using the Enhanced Golay Correlator (EGC) or a variant of this method. The EGC and variants are an efficient implementation of a circular correlator and can efficiently support DC offset estimation and removal. The synchronization can be done either using a sliding window time correlator or a circular correlator performed each sample.

It is important to be able to detect the preamble at SNR values that are lower than that expected for a reliable message decoding. From the current requirements with a modulation depth of 0.1 the lowest SNR value encountered is ~0 dB. It is expected that the preamble detection and synchronization can work at <0 dB SNR value.

Figures 18, 19:
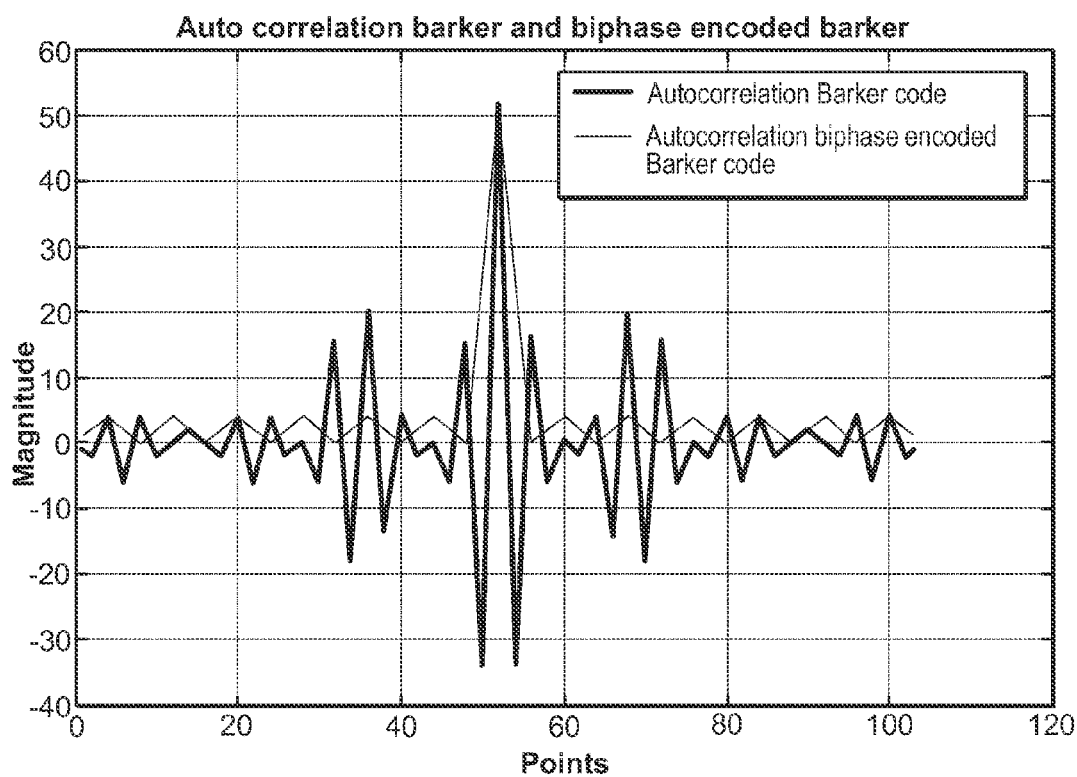
FIG. 18 is a graph illustrating the autocorrelation of Barker and biphase encoded Barker sequence.
FIG. 19 is to able illustrating a 13 bit Barker code and its inverted version.

Biphase encoding a signal with good autocorrelation characteristics will make the autocorrelation characteristics poorer. FIG. 18 shows the characteristics of the 13 bit Barker sequence with and without biphase encoding. As can be seen from FIG. 18, it would be desirable to avoid using biphase encoding for the preamble sequence. FIG. 19 shows the 13 bit Barker code and its inverted version. Having the requirement that the number of consecutive "1"s per half bit is less than or equal to three then the inverted version of the Barker's code can be used directly without additional biphase encoding. Note that this means the Barker code will operate at 4 kHz which is twice the bit rate of the message (2 kHz). FIG. 20 shows the performance of the Barker code for Preamble detection.

Figure 21:
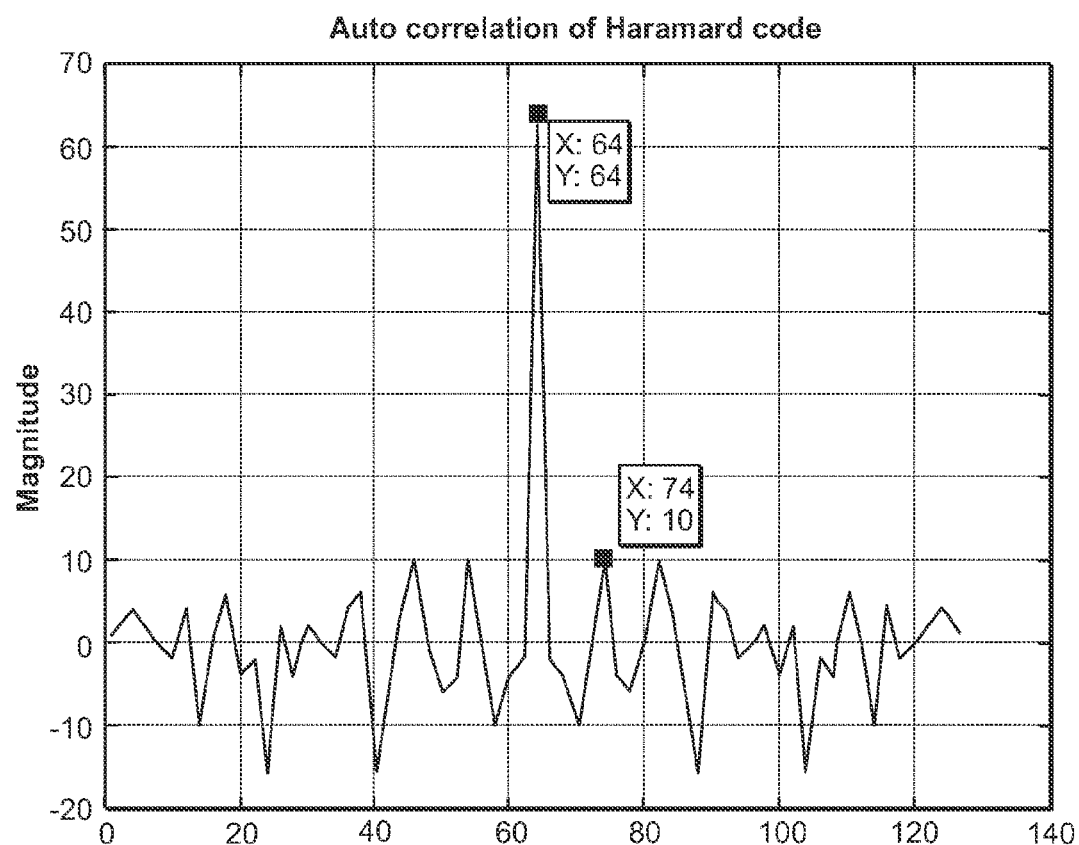
FIG. 21 is a graph illustrating the autocorrelation of Hadamard sequence.

The performance of the Barker code shown meets requirements for the AWGN case. The autocorrelation properties of several M-sequences and complementary Hadamard sequences of length 32 were also investigated and it was found that the Hadamard sequences had good auto correlation properties. The auto correlation of the Hadamard sequence is shown in FIG. 21. Even though the ratio of the peak to side lobe of the Hadamard autocorrelation is less than the Barker code the additional length of the Hadamard allows more averaging.

FIG. 22 shows the performance of the Hadamard sequence. The performance of the Hadamard sequence meets the requirements of the preamble detection.

Figure 24:
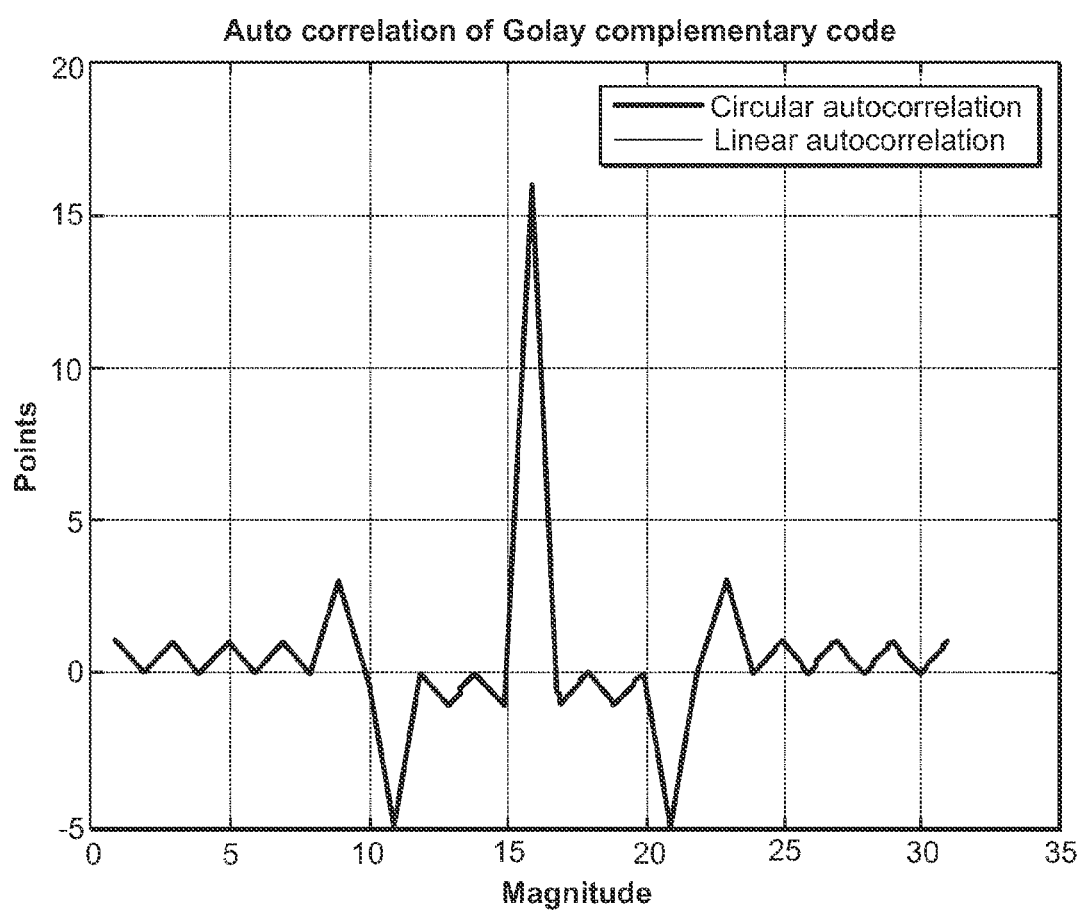
FIG. 24 is a graph illustrating the autocorrelation of Golay complementary sequence.

Golay complementary sequences have good autocorrelation characteristics. FIG. 23 shows a 2×8 Golay complementary sequence. FIG. 24 shows the auto-correlation of the Golay complementary sequence.

Figure 25A:
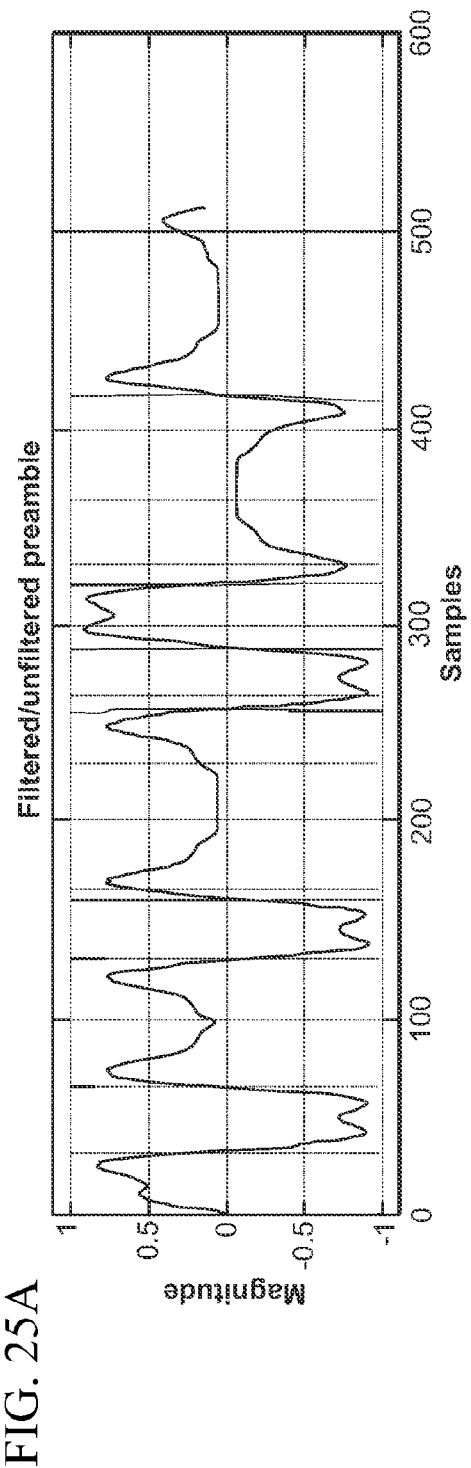
FIGS. 25A-25B are graphs illustrating the output waveforms after pulse shaping filtering including DC offset removal.
Figure 25B:
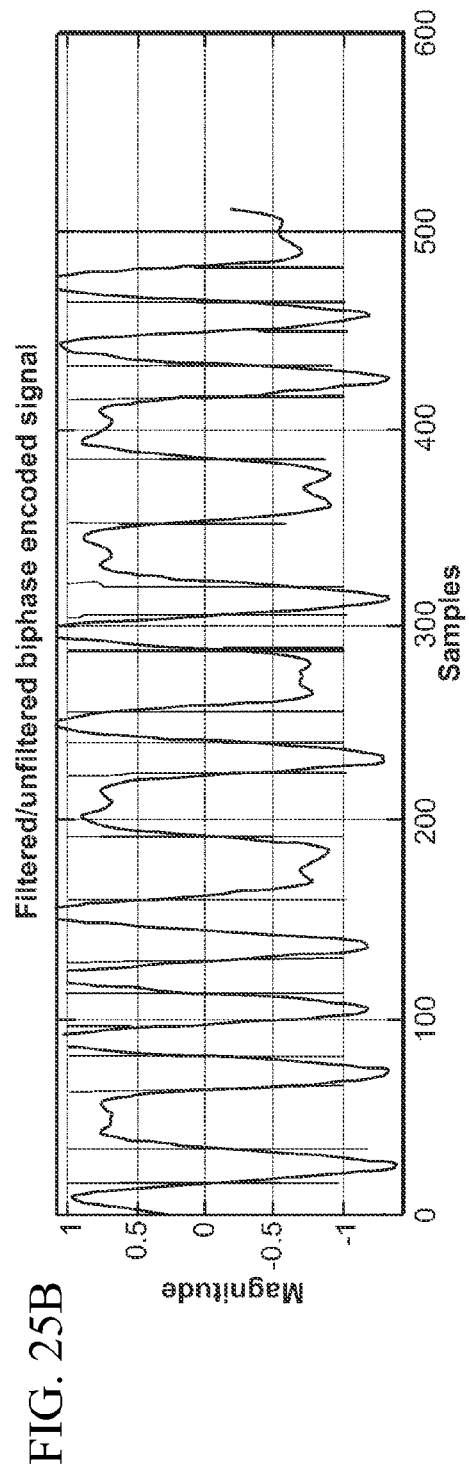
Figure 26:
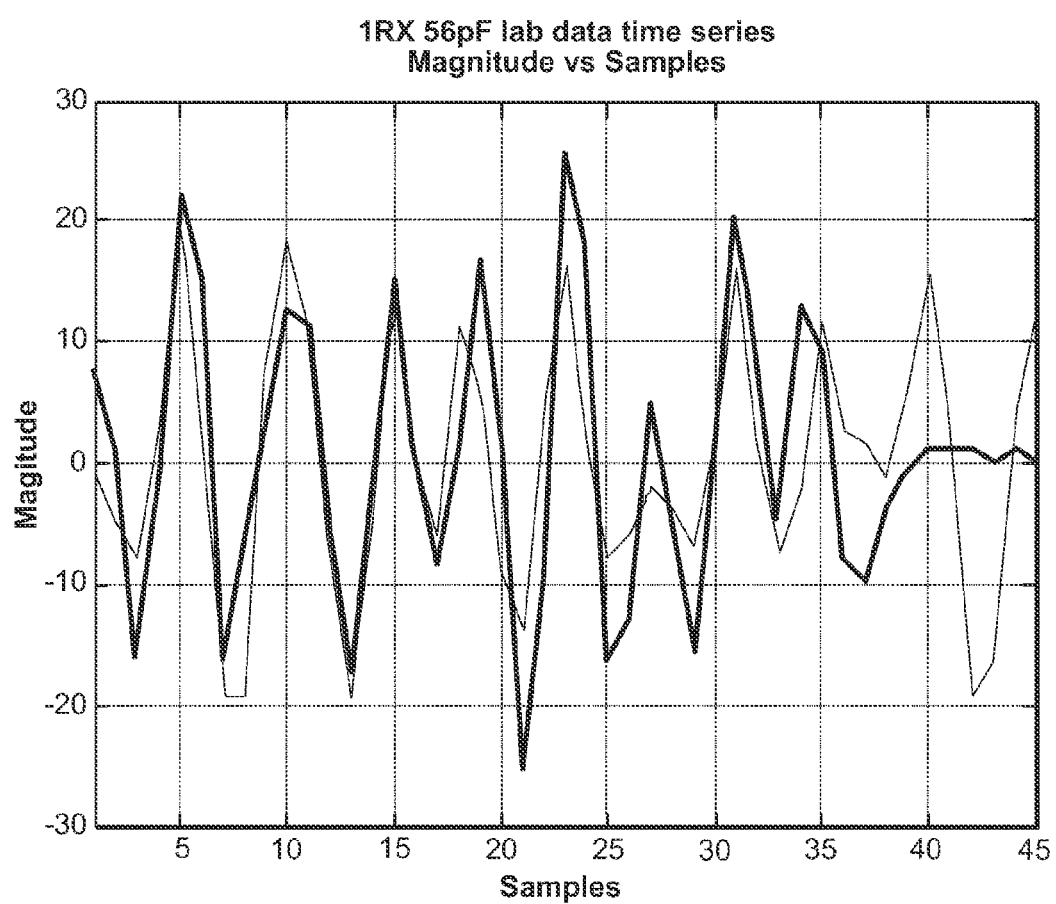
FIG. 26 is a graph illustrating the captured Golay complementary sequence after pulse shaping filtering including DC offset removal.

FIG. 25A shows the Golay complementary sequence and a random biphase signal after pulse shaping filtering with DC offset removal. A can be seen in FIG. 25B, part of the wanted signal of the preamble is removed by the pulse shaping filter with DC offset removal. The synchronization procedure is robust but in conditions where the modulation depth of the signal is low then this method of DC offset removal may not be acceptable. FIG. 26 shows two preamble signals captured in the laboratory. Both preamble signals are distorted which reduces the probability of detection. For this reason it was decided to use the moving average DC offset removal.

Figure 27:
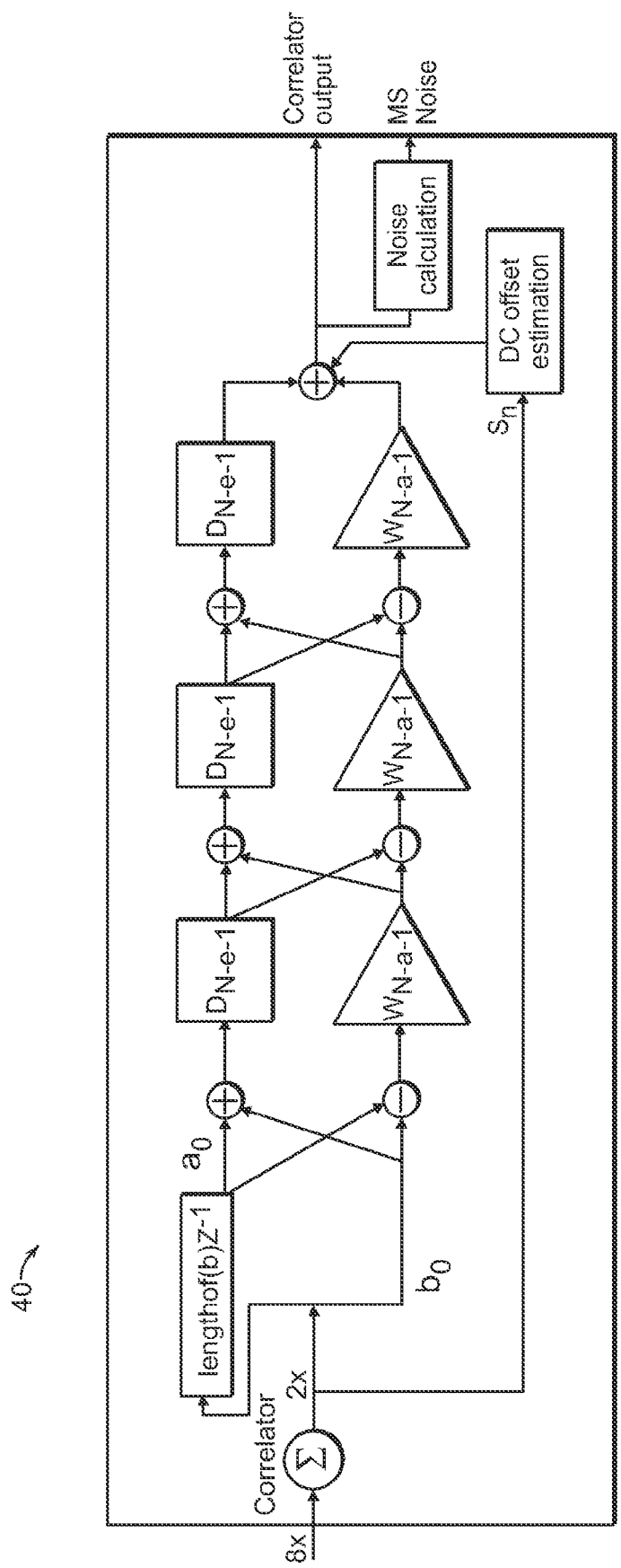
FIG. 27 is schematic diagram illustrating the preamble detector correlator.

To minimize the amount of processing required by the preamble detector the correlator 40 has been implemented as an Optimized Golay Correlator (OGC) with the noise estimation and DC offset estimation and removal built into the correlator block 40, as shown in FIG. 27. As shown in FIG. 27, the correlator block as the following relationships:

$$a'_0[k] = a[k] \qquad \text{Eq. 11}$$

$$b'_0[k] = b[k] \qquad \text{Eq. 12}$$

$$a'_n[k] = a'_{n-1}[k - D_{N-n-1}] + b'_{n-1}[k - D_{N-n-1}] \qquad \text{Eq. 13}$$

$$a'_n[k] = W_{N-n-1}(a'_{n-1}[k - D_{N-n-1}] - b'_{n-1}[k - D_{N-n-1}]) \qquad \text{Eq. 14}$$

$$a'_N[k] + b'_N[k] \qquad \text{Eq. 15}$$

$$Y[k] = a'_N[k] + b'_N[k] \qquad \text{Eq. 16}$$

$$MS \text{ Noise} = \frac{1}{L}\sum_{l=0}^{L-1} Y[l]^2 \qquad \text{Eq. 17}$$

where N=3, n=0,1,2, k=0, . . . , 7, L=7, a[k] and b[k] are the received signals, a'$_i$[k] and b'$_i$[k] are partial results, Y[k] is the correlation between the input signal and the Golay sequence, Y[7] is the correlator output, MS Noise is the mean square of the noise for the current correlator output.

The DC offset is calculated using the equation below:

$$DC \text{ offset} = \frac{1}{N}\sum_{n=0}^{N-1} S_n \qquad \text{Eq. 18}$$

where N is the number of samples in the preamble sequence.

After a peak is detected the timing alignment needs to be determined so that this can be feedback to the pulse shaping filter to adjust the input samples to give the best timing alignment. The timing alignment of the received signal can be obtained by using an interpolation filter on the down sampled correlation data used for the preamble detection. Due to the interpolation the data must be padded with zeros. Only five correlation values are required around the correlation peak (zn).

$$Z_m = (z_{n-2}, 0, 0, 0, z_{n-1}, 0, 0, 0, z_n, 0, 0, 0, z_{n+1}, 0, 0, 0, z_{n+2}, 0, 0, 0).$$

The output of the interpolator and the data gives:

$$B(k) = b_0 + b_1 + \ldots + b_k, \text{ where } k = m+n-1$$

The location of the peak detected in the previous operation in the interpolated data set is at $b_{15}$. A search can be done around sample $b_{15}$ of +/−3 samples to determine if there is a greater value.

To simplify the interpolation procedure the interpolation filter's tapped delay line can be pre-loaded and only seven operations of the interpolation filter is required. A more efficient implementation would be to avoid a filter structure and use seven dedicated operations. Table 2 shows simplified interpolation filtering and Table 3 shows the dedicated sub-operations for interpolations filtering.

| Interpolations Coefficients | Tapped delay lines | | | | | | |
|---|---|---|---|---|---|---|---|
| −2 | 0 | 0 | $z_{n-2}$ | 0 | 0 | 0 | $z_{n-1}$ |
| −3 | 0 | $z_{n-2}$ | 0 | 0 | 0 | $z_{n-1}$ | 0 |
| −2 | $z_{n-2}$ | 0 | 0 | 0 | $z_{n-1}$ | 0 | 0 |
| 0 | 0 | 0 | 0 | $z_{n-1}$ | 0 | 0 | 0 |
| 9 | 0 | 0 | $z_{n-1}$ | 0 | 0 | 0 | $z_n$ |
| 18 | 0 | $z_{n-1}$ | 0 | 0 | 0 | $z_n$ | 0 |
| 26 | $z_{n-1}$ | 0 | 0 | 0 | $z_n$ | 0 | 0 |
| 31 | 0 | 0 | 0 | $z_n$ | 0 | 0 | 0 |
| 26 | 0 | 0 | $z_n$ | 0 | 0 | 0 | $z_{n+1}$ |
| 18 | 0 | $z_n$ | 0 | 0 | 0 | $z_{n+1}$ | 0 |
| 9 | $z_n$ | 0 | 0 | 0 | $z_{n+1}$ | 0 | 0 |
| 0 | 0 | 0 | 0 | $z_{n+1}$ | 0 | 0 | 0 |
| −2 | 0 | 0 | $z_{n+1}$ | 0 | 0 | 0 | $z_{n+2}$ |
| −3 | 0 | $z_{n+1}$ | 0 | 0 | 0 | $z_{n+2}$ | 0 |
| −2 | $z_{n+1}$ | 0 | 0 | 0 | $z_{n+2}$ | 0 | 0 |
| Filter output | b12 | b13 | b14 | b15 | b16 | b17 | b18 |

TABLE 3

| Filter output | Operation |
|---|---|
| b12 | −2 * [(Zn − 2) + (Zn + 1)] + 26 * (Zn − 1) + 9 * (Zn) |
| b13 | −3 * [(Zn − 2) + (Zn + 1)] + 18 * [(Zn − 1) + (Zn)] |
| b14 | −2 * [(Zn − 2) + (Zn + 1)] + 9 * (Zn − 1) + 26 * (Zn) |
| b15 | 31 * (Zn) |
| b16 | −2 * [(Zn − 1) + (Zn + 2)] + 26 * (Zn) + 9 * (Zn + 1) |
| b17 | −3 * [(Zn − 1) + (Zn + 2)] + 18 * [(Zn) + (Zn + 1)] |
| b18 | −2 * [(Zn − 1) + (Zn + 2)] + 9 * (Zn) + 26 * (Zn + 1) |

Following the synchronization the receiver performs demodulation by providing the functions of (optional) equalization, modulation decoding, channel decoding of the message and CRC check.

One of the items considered for the use in demodulation part of the receiver is equalizer. Experiments have determined that for the channel with time dispersion using the equalizer can be beneficial and it can be signaled by the flag from synchronization module.

The biphase with error correction method makes use of the soft bits, the characteristics of biphase encoding and maximum likelihood (ML) correction. Looking at FIG. 28 it can be seen that a biphase encoded signal must change sign at the start of every bit. If the received signal does not change sign at the start of every bit then a comparison of the magnitude of the previous end of bit and the start of the current bit can be used to determine which bit's—end or start—sign is changed. FIG. 29 shows the ML biphase demodulation truth table and FIG. 30 shows pseudo code for ML biphase demodulation.

Figure 32:
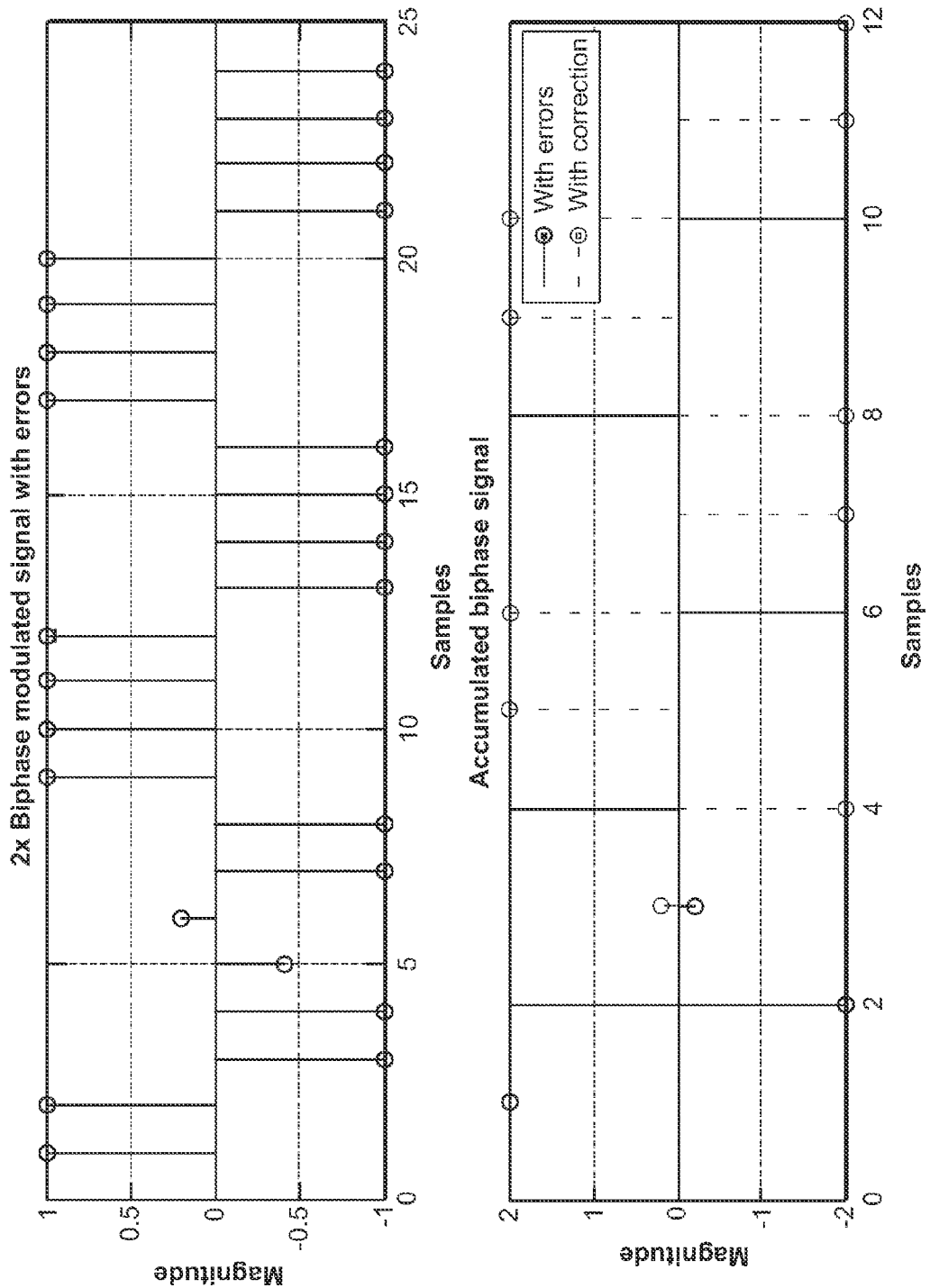
FIG. 32 is a graph illustrating an example of biphase decoding with error correction.

FIG. 31 shows the steps for biphase decoding with error correction. FIG. 32 shows an example of biphase decoding with error correction.

The invention produces BER results using a system configuration with the following: (1) Biphase modulation; (2) pulse shaping filter at the receiver; and (3) Channel coding BCH.

The following describes a possible decoder implementation of a (15,7) double-error-correcting BCH Code. After receiving a possibly distorted codeword c̃, compute the syndrome of the BCH code by a modulo 2 matrix multiplication s=Hc̃, where s is an 8-bit binary vector. No error is detected if s=0. If s≠0, the syndrome and its corresponding error vector is shown in Table 3. If a nonzero s is not in Table 3, then the information bits of the codeword is not affected by the error. Table 3 shows the error pattern for different syndromes s for the regular (15,7) BCH Code

TABLE 3

| s (Decimal Value of an 8-Bit Binary Vector) | Error Pattern |
| --- | --- |
| 209 | 1 0 0 0 0 0 0 0 0 0 0 0 0 |
| 115 | 0 1 0 0 0 0 0 0 0 0 0 0 0 |
| 230 | 0 0 1 0 0 0 0 0 0 0 0 0 0 |
| 29 | 0 0 0 1 0 0 0 0 0 0 0 0 0 |
| 58 | 0 0 0 0 1 0 0 0 0 0 0 0 0 |
| 116 | 0 0 0 0 0 1 0 0 0 0 0 0 0 |
| 232 | 0 0 0 0 0 0 1 0 0 0 0 0 0 |
| 1 | 0 0 0 0 0 0 0 1 0 0 0 0 0 |
| 2 | 0 0 0 0 0 0 0 0 1 0 0 0 0 |
| 4 | 0 0 0 0 0 0 0 0 0 1 0 0 0 |
| 8 | 0 0 0 0 0 0 0 0 0 0 1 0 0 |
| 16 | 0 0 0 0 0 0 0 0 0 0 0 1 0 |
| 32 | 0 0 0 0 0 0 0 0 0 0 0 0 1 |
| 64 | 0 0 0 0 0 0 0 0 0 0 0 0 1 0 |
| 128 | 0 0 0 0 0 0 0 0 0 0 0 0 1 |
| 208 | 1 0 0 0 0 0 0 1 0 0 0 0 0 |
| 211 | 1 0 0 0 0 0 0 0 1 0 0 0 0 |
| 213 | 1 0 0 0 0 0 0 0 0 1 0 0 0 |
| 217 | 1 0 0 0 0 0 0 0 0 0 1 0 0 |
| 193 | 1 0 0 0 0 0 0 0 0 0 0 1 0 |
| 241 | 1 0 0 0 0 0 0 0 0 0 0 0 1 |
| 145 | 1 0 0 0 0 0 0 0 0 0 0 1 0 |
| 81 | 1 0 0 0 0 0 0 0 0 0 0 0 1 |
| 114 | 0 1 0 0 0 0 0 1 0 0 0 0 0 |
| 113 | 0 1 0 0 0 0 0 0 1 0 0 0 0 |
| 119 | 0 1 0 0 0 0 0 0 0 1 0 0 0 |
| 123 | 0 1 0 0 0 0 0 0 0 0 1 0 0 |
| 99 | 0 1 0 0 0 0 0 0 0 0 0 1 0 |
| 83 | 0 1 0 0 0 0 0 0 0 0 0 0 1 |
| 51 | 0 1 0 0 0 0 0 0 0 0 0 1 0 |
| 243 | 0 1 0 0 0 0 0 0 0 0 0 0 1 |
| 231 | 0 0 1 0 0 0 0 1 0 0 0 0 0 |
| 228 | 0 0 1 0 0 0 0 0 1 0 0 0 0 |
| 226 | 0 0 1 0 0 0 0 0 0 1 0 0 0 |
| 238 | 0 0 1 0 0 0 0 0 0 0 1 0 0 |
| 246 | 0 0 1 0 0 0 0 0 0 0 0 1 0 |
| 198 | 0 0 1 0 0 0 0 0 0 0 0 1 0 0 |
| 166 | 0 0 1 0 0 0 0 0 0 0 0 0 1 0 |
| 102 | 0 0 1 0 0 0 0 0 0 0 0 0 0 1 |
| 28 | 0 0 0 1 0 0 0 1 0 0 0 0 0 |
| 31 | 0 0 0 1 0 0 0 0 1 0 0 0 0 |
| 25 | 0 0 0 1 0 0 0 0 0 1 0 0 0 |
| 21 | 0 0 0 1 0 0 0 0 0 0 1 0 0 |
| 13 | 0 0 0 1 0 0 0 0 0 0 0 1 0 |
| 61 | 0 0 0 1 0 0 0 0 0 0 0 1 0 0 |
| 93 | 0 0 0 1 0 0 0 0 0 0 0 0 1 0 |
| 157 | 0 0 0 1 0 0 0 0 0 0 0 0 0 1 |
| 59 | 0 0 0 0 1 0 0 1 0 0 0 0 0 |
| 56 | 0 0 0 0 1 0 0 0 1 0 0 0 0 |
| 62 | 0 0 0 0 1 0 0 0 0 1 0 0 0 |
| 50 | 0 0 0 0 1 0 0 0 0 0 1 0 0 |
| 42 | 0 0 0 0 1 0 0 0 0 0 0 1 0 0 |
| 26 | 0 0 0 0 1 0 0 0 0 0 0 1 0 0 |
| 122 | 0 0 0 0 1 0 0 0 0 0 0 0 1 0 |
| 186 | 0 0 0 0 1 0 0 0 0 0 0 0 0 1 |
| 117 | 0 0 0 0 0 1 0 1 0 0 0 0 0 |
| 118 | 0 0 0 0 0 1 0 0 1 0 0 0 0 |
| 112 | 0 0 0 0 0 1 0 0 0 1 0 0 0 |
| 124 | 0 0 0 0 0 1 0 0 0 0 1 0 0 |
| 100 | 0 0 0 0 0 1 0 0 0 0 0 1 0 |
| 84 | 0 0 0 0 0 1 0 0 0 0 0 1 0 0 |
| 52 | 0 0 0 0 0 1 0 0 0 0 0 0 1 0 |
| 244 | 0 0 0 0 0 1 0 0 0 0 0 0 0 1 |
| 233 | 0 0 0 0 0 0 1 1 0 0 0 0 0 |
| 234 | 0 0 0 0 0 0 1 0 1 0 0 0 0 |
| 236 | 0 0 0 0 0 0 1 0 0 1 0 0 0 |
| 224 | 0 0 0 0 0 0 1 0 0 0 1 0 0 |
| 248 | 0 0 0 0 0 0 1 0 0 0 0 1 0 |
| 200 | 0 0 0 0 0 0 1 0 0 0 0 1 0 0 |
| 168 | 0 0 0 0 0 0 1 0 0 0 0 0 1 0 |
| 104 | 0 0 0 0 0 0 1 0 0 0 0 0 0 1 |
| 162 | 1 1 0 0 0 0 0 0 0 0 0 0 0 |
| 55 | 1 0 1 0 0 0 0 0 0 0 0 0 0 |
| 149 | 0 1 1 0 0 0 0 0 0 0 0 0 0 |
| 204 | 1 0 0 1 0 0 0 0 0 0 0 0 0 |
| 110 | 0 1 0 1 0 0 0 0 0 0 0 0 0 |
| 251 | 0 0 1 1 0 0 0 0 0 0 0 0 0 |

TABLE 3-continued

| s (Decimal Value of an 8-Bit Binary Vector) | Error Pattern |
| --- | --- |
| 235 | 1 0 0 0 1 0 0 0 0 0 0 0 0 |
| 73 | 0 1 0 0 1 0 0 0 0 0 0 0 0 |
| 220 | 0 0 1 0 1 0 0 0 0 0 0 0 0 |
| 39 | 0 0 0 1 1 0 0 0 0 0 0 0 0 |
| 165 | 1 0 0 0 0 1 0 0 0 0 0 0 0 |
| 7 | 0 1 0 0 0 1 0 0 0 0 0 0 0 |
| 146 | 0 0 1 0 0 1 0 0 0 0 0 0 0 |
| 105 | 0 0 0 1 0 1 0 0 0 0 0 0 0 |
| 78 | 0 0 0 0 1 1 0 0 0 0 0 0 0 |
| 57 | 1 0 0 0 0 0 1 0 0 0 0 0 0 |
| 155 | 0 1 0 0 0 0 1 0 0 0 0 0 0 |
| 14 | 0 0 1 0 0 0 1 0 0 0 0 0 0 |
| 245 | 0 0 0 1 0 0 1 0 0 0 0 0 0 |
| 210 | 0 0 0 0 1 0 1 0 0 0 0 0 0 |
| 156 | 0 0 0 0 0 1 1 0 0 0 0 0 0 |

*Syndrome values not in the table correspond to a zero error vector.

The following describes a possible decoder implementation of a (13,8) enhanced Hamming code. After receiving a possibly distorted codeword č, compute the syndrome of the enhanced Hamming code by a modulo 2 matrix multiplication s=Hč, where s is a 5-bit binary vector. Use s as the index to perform a (32×13) table lookup operation. The table of error patterns is described in Table 4. Table 4 shows the error pattern for different syndromes s for the (13,8) enhanced Hamming code

TABLE 4

| s (Decimal Value of an 5-Bit Binary Vector) | Error Pattern e |
| --- | --- |
| 0 | 0 0 0 0 0 0 0 0 0 0 0 0 0 |
| 1 | 0 0 0 0 0 0 0 0 1 0 0 0 0 |
| 2 | 0 0 0 0 0 0 0 0 0 1 0 0 0 |
| 3 | 0 0 0 0 0 0 0 0 1 1 0 0 0 |
| 4 | 0 0 0 0 0 0 0 0 0 0 1 0 0 |
| 5 | 0 0 0 0 0 0 1 1 0 0 0 0 0 |
| 6 | 0 0 0 0 0 0 0 0 0 1 1 0 0 |
| 7 | 0 0 0 0 1 1 0 0 0 0 0 0 0 |
| 8 | 0 0 0 0 0 0 0 0 0 0 0 1 0 |
| 9 | 0 0 0 0 0 0 0 0 0 0 0 0 0 |
| 10 | 0 0 0 0 0 1 0 0 0 0 0 0 0 |
| 11 | 0 0 1 0 0 0 0 0 0 0 0 0 0 |
| 12 | 0 0 0 0 0 0 0 0 0 1 1 0 |
| 13 | 0 0 0 0 1 0 0 0 0 0 0 0 0 |
| 14 | 1 0 0 0 0 0 0 0 0 0 0 0 0 |
| 15 | 0 0 0 0 0 0 0 0 0 0 0 0 0 |
| 16 | 0 0 0 0 0 0 0 0 0 0 0 0 1 |
| 17 | 0 0 0 0 0 0 1 0 0 0 0 0 0 |
| 18 | 0 0 0 1 0 0 0 0 0 0 0 0 0 |
| 19 | 1 1 0 0 0 0 0 0 0 0 0 0 0 |
| 20 | 0 0 0 0 0 0 0 1 0 0 0 0 0 |
| 21 | 0 0 0 0 0 0 0 1 1 0 0 0 0 |
| 22 | 0 1 1 0 0 0 0 0 0 0 0 0 0 |
| 23 | 0 0 0 0 0 0 0 0 0 0 0 0 0 |
| 24 | 0 0 0 0 0 0 0 0 0 0 0 1 1 |
| 25 | 0 0 1 1 0 0 0 0 0 0 0 0 0 |
| 26 | 0 0 0 0 0 0 0 0 0 0 0 0 0 |
| 27 | 0 0 0 0 0 1 1 0 0 0 0 0 0 |
| 28 | 0 0 0 0 0 0 0 0 0 0 0 0 0 |
| 29 | 0 1 0 0 0 0 0 0 0 0 0 0 0 |
| 30 | 1 0 0 0 0 0 0 0 0 0 0 0 1 |
| 31 | 0 0 0 1 1 0 0 0 0 0 0 0 0 |

After finding the error vector e, the original codeword can be computed as c=č+e, where + is the modulo 2 addition. The first 8 bits in c are the original information bits.

Figure 33A:
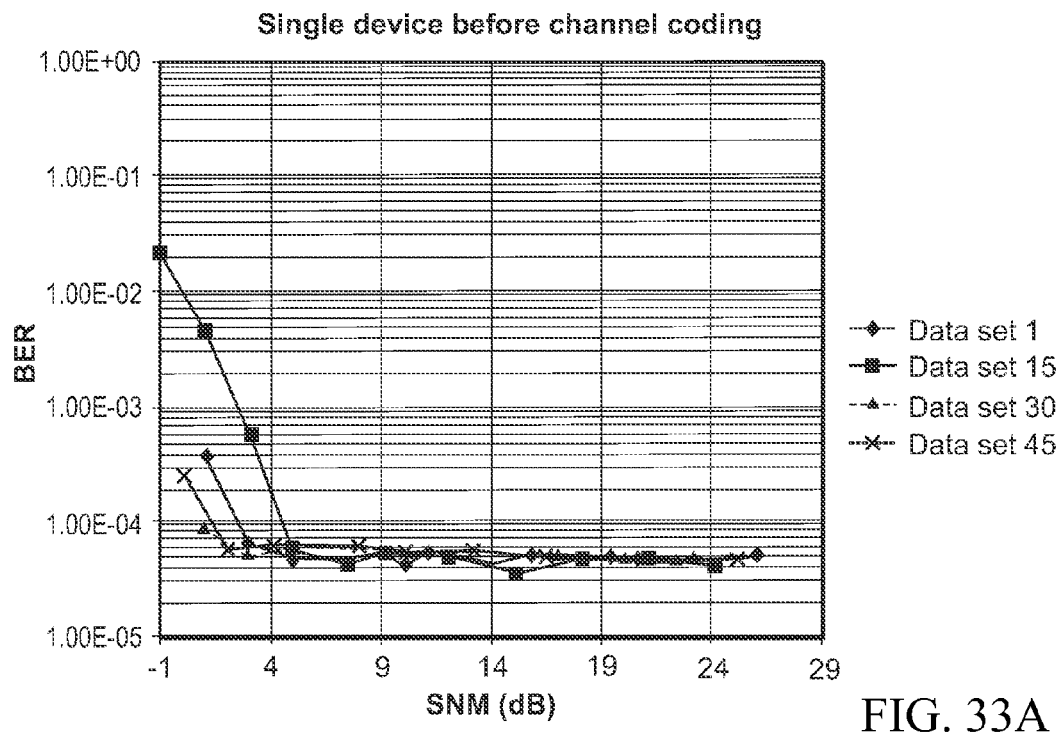
FIGS. 33A-33B are graphs illustrating the performance of the single device BER before and after channel decoding.
Figure 33B:
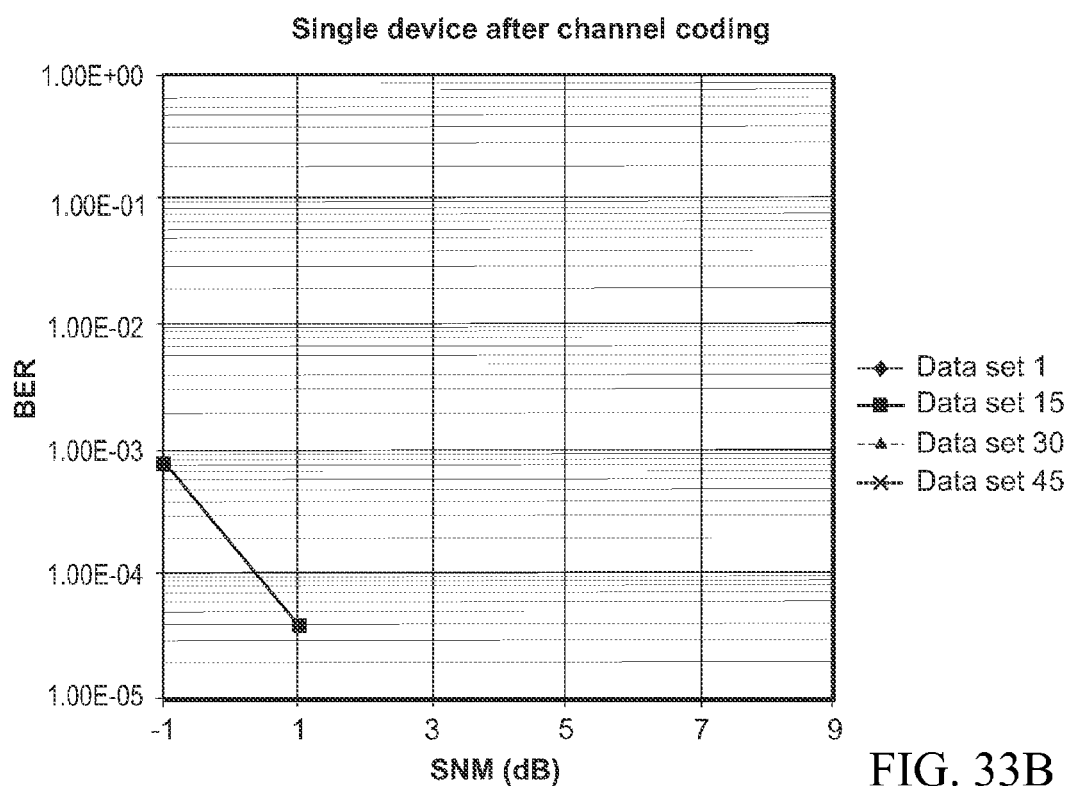
Figure 34A:
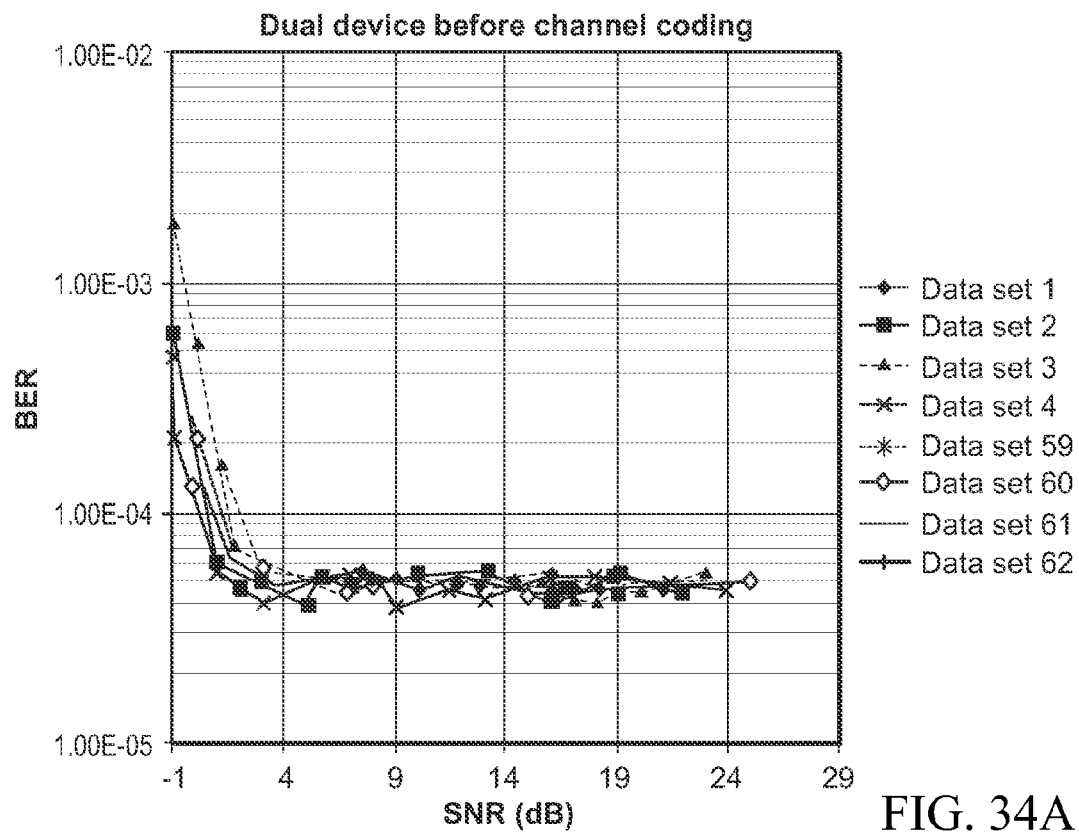
FIGS. 34A-34B are graphs illustrating the; and the performance of the dual device BER before and after channel decoding.
Figure 34B:
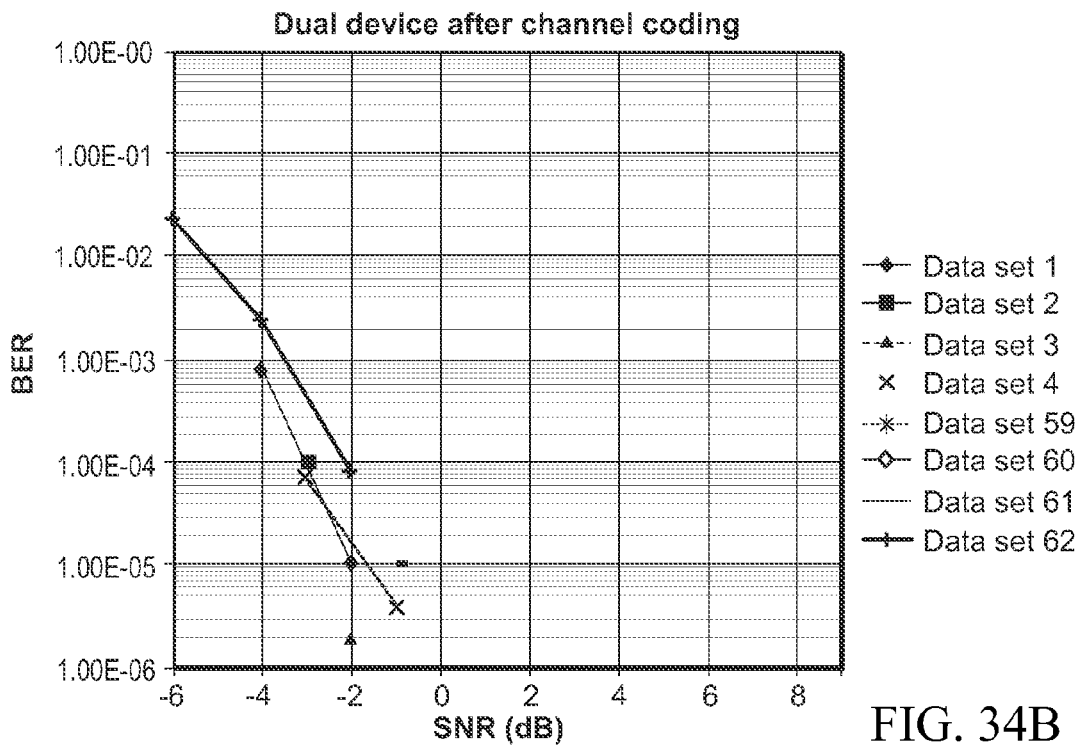
Figure 35A:
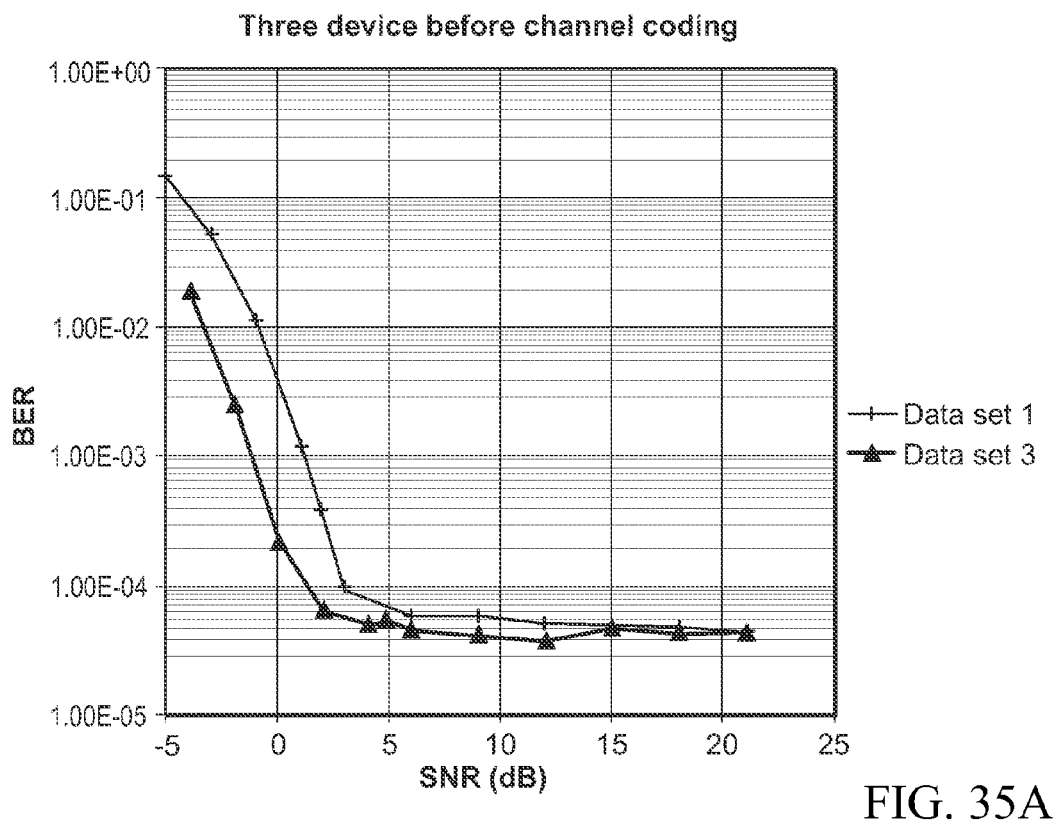
FIGS. 35A-35B are graphs illustrating the performance of the three devices BER before and after channel decoding.
Figure 35B:
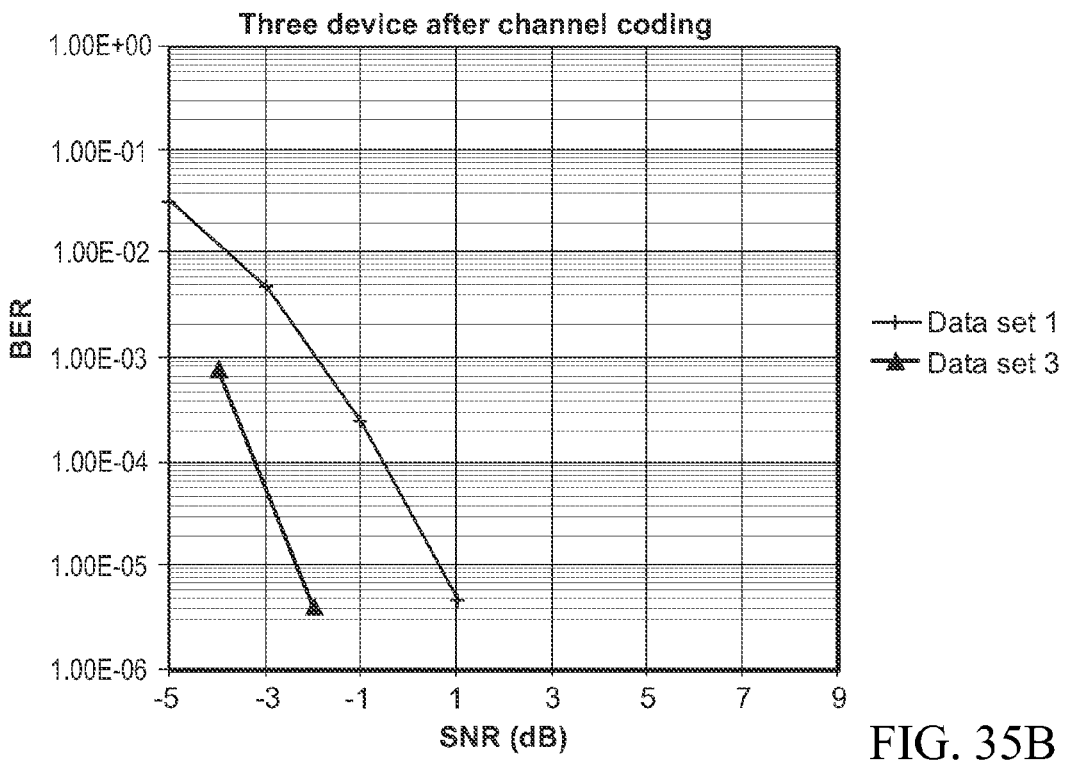

FIGS. 33A-33B show the experimental results for single device case that the inventive receiver design meets the requirements of a BER <$10^{-5}$ at the operating points. FIGS. 34A-34B shows the results for a dual device case that the inventive receiver design meets the requirements of a BER <$10^{-5}$ at the operating points. While FIGS. 35A-35B shows the results for three device case that the inventive receiver design meets the requirements of a BER <$10^{-5}$ at the operating points.

Although the present invention has been shown and described with respect to several preferred embodiments thereof, various changes, omissions and additions to the form and detail thereof, may be made therein, without departing from the spirit and scope of the invention.

What is claimed is:

1. A wireless charging in-band communication system, the wireless charging in-band communication system being used for performing communication between a load device and a source device, the wireless charging in-band communication system comprising:
    a transmitter module that is positioned within the load device and formats a message using CRC calculation and attaches the results of the CRC calculation to the message for message error detection, the transmitter module includes a channel encoding module for message error correction, and a modulation module that performs biphase modulation for DC balanced signals and impedance switching to change reflected impedance seen by the source device, and a synchronization module that prepends the message with a synchronization sequence having Golay complementary codes; and
    a receiver module that is positioned within the source device and receives the message from the transmitter module, the receiver module includes an impedance sensing circuit to detect changes in the reflected impedance of the transmitter module, the receiver module includes a front end filter used for pulse shaping and noise rejection, a preamble detection block having a Golay complementary code correlator used for message detection, synchronization, and equalization coefficient estimation and selection, and a decoding module that performs biphase demodulation with error correction with a DC offset being estimated as the average value of the signal over the length of the message before channel decoding, the decoding module performs equalization, error correction channel decoding, and error detection (CRC);
    wherein the message is transmitted outward by the transmitter module through changing the reflected impedance, and the message transmitted by the transmitter module is a message corresponding to usage related to power transfer, so as to affect power transfer control of the source device; and
    the synchronization module provides a gap between the preamble and message, for timing adjustments in the receiver module.

2. The wireless charging in-band communication system of claim 1, wherein the front end filter comprises of downsampling and pulse shaping filters having a plurality of filters sections.

3. The wireless charging in-band communication system of claim 1, wherein an input signal from the impedance sensing circuit is oversampled and a plurality of downsampling and pulse shaping filters within the front end filter increase the number of effective bits.

4. The wireless charging in-band communication system of claim 1, wherein a plurality of pulse shaping filters within the front end filter utilizes a DC removal block to remove DC components of a message.

5. The wireless charging in-band communication system of claim 1, wherein the transmitter and receiver modules utilize BCH or Hamming code for developing a codeword.

6. The wireless charging in-band communication system of claim 1, wherein the transmitter module utilizes the modulation module to perform biphase modulation.

7. The wireless charging in-band communication system of claim 1, wherein the receiver module comprises a sliding window time correlator or a circular correlator.

8. The wireless charging in-band communication system of claim 1, wherein the preamble detection block comprises an Optimized Golay Correlator (OGC) with the noise estimation and DC offset estimation and removal.

9. The wireless charging in-band communication system of claim 1, wherein the synchronization module provides the gap between the preamble and message to allow timing adjustments done by the preamble detection block in the receiver module to take effect at the output of the front end filter in time for the message to be received.

10. The wireless charging in-band communication system of claim 1, wherein the biphase demodulation uses an inverted version of the correlation sequence to reduce the number of consecutive "1"s.

11. The wireless charging in-band communication system of claim 1, wherein the biphase demodulation comprises coarse DC offset removal as part of the front end filter and fine DC offset done digitally.

12. The wireless charging in-band communication system of claim 5, wherein the codeword comprises information bits and redundant bits.

13. The wireless charging in-band communication system of claim 5, wherein the codeword comprises 15 bits.

14. The wireless charging in-band communication system of claim 5, wherein the codeword comprises 13 bits.

15. A method of performing the operations of a wireless charging in-band communication system, the wireless charging in-band communication system being used for performing communication between a load device and a source device, the method comprising:
    formatting a message using CRC calculation and attaching the results of the CRC calculation to the message for message error detection;
    performing biphase modulation for DC balanced signals using a modulation module of a transmitter module, including impedance switching to change reflected impedance seen by the source device, wherein the transmitter module is positioned within the load device;
    prepending the message with a synchronization sequence having Golay complementary codes using a synchronization module;
    receiving the message from the transmitter module using a receiver module, wherein the receiver module is positioned within the source device;
    providing an impedance sensing circuit to detect changes in the reflected impedance of the transmitter module;
    providing a front end filter used for pulse shaping and noise rejection;
    using a Golay complementary code correlator for message detection, synchronization, and equalization coefficient estimation and selection;
    performing biphase demodulation with error correction with a DC offset being estimated as the average value of the signal over the length of the message before channel decoding using a biphase demodulator module; and
    performing equalization, error correction channel decoding, and error detection (CRC);

wherein the message is transmitted outward by the transmitter module through changing the reflected impedance, and the message transmitted by the transmitter module is a message corresponding to usage related to power transfer, so as to affect power transfer control of the source device; and the synchronization module provides a gap between the preamble and message, for timing adjustments in the receiver module.

16. The method system of claim 15, wherein the front end filter comprises of downsampling and pulse shaping filters having a plurality of filters sections.

17. The method system of claim 15, wherein an input signal from the impedance sensing circuit is oversampled and a plurality of downsampling and pulse shaping filters within the front end filter increase the number of effective bits.

18. The method system of claim 15, wherein a plurality of pulse shaping filters within the front end filter utilizes a DC removal block to remove DC components of a message.

19. The method system of claim 15, wherein the transmitter and receiver modules utilize BCH or Hamming code for developing a codeword.

20. The method system of claim 15, wherein the transmitter module utilizes the modulation module to perform biphase modulation.

21. The method system of claim 15, wherein the receiver module comprises a sliding window time correlator or a circular correlator.

22. The method of claim 15, wherein the receiver module includes a preamble detection block having the Golay complementary code correlator;

and the preamble detection block comprises an Optimized Golay Correlator (OGC) with the noise estimation and DC offset estimation and removal.

23. The method of claim 15, wherein the receiver module includes a preamble detection block having the Golay complementary code correlator; and the synchronization module provides the gap between the preamble and message to allow timing adjustments done by the preamble detection block in the receiver module to take effect at the output of the front end filter in time for the message to be received.

24. The method of claim 15, wherein the biphase demodulation uses an inverted version of the correlation sequence to reduce the number of consecutive "1"s.

25. The method of claim 15, wherein the biphase demodulation comprises coarse DC offset removal as part of the front end filter and fine DC offset.

26. The method system of claim 19, wherein the codeword comprises information bits and redundant bits.

27. The method system of claim 19, wherein the codeword comprises 15 bits.

28. The method of claim 19, wherein the codeword comprises 13 bits.

29. A transmitter module, used in a wireless charging system, for performing in-band communication with a receiver module in the wireless charging system to provide a message to the receiver module, the transmitter module comprising:

a check module, arranged for attaching check calculation results of the message to the message to generate an attached result, for message error detection;

an encoding module, arranged for performing channel encoding on the attached result to generate an encoded result;

a modulation module, arranged for performing modulation on the encoded result, including performing impedance switching to provide the message to the receiver module by changing reflected impedance seen by the receiver module; and a synchronization module, arranged for prepending the message with a synchronization sequence having specific codes;

wherein the message is transmitted outward by the transmitter module through changing the reflected impedance, and the message transmitted by the transmitter module is a message corresponding to usage related to power transfer, so as to affect power transfer control of the receiver module; and the synchronization module provides a gap between the preamble and message, for timing adjustments in the receiver module.

30. The transmitter module of claim 29, wherein the check module performs a CRC calculation on the message to generate the check calculation results.

31. The transmitter module of claim 29, wherein the channel encoding comprises BCH or Hamming encoding.

32. The transmitter module of claim 29, wherein the modulation module performs biphase modulation.

33. The transmitter module of claim 29, wherein the specific codes comprise Golay complementary codes.

34. A receiver module, used in a wireless charging system, for performing in-band communication with a transmitter module in the wireless charging system to receive a message provided by the transmitter module, the receiver module comprising:

an impedance sensing circuit, arranged for detecting changes in the reflected impedance of the transmitter module, wherein the message is included by the changes in the reflected impedance;

a front end filter, coupled to the impedance sensing circuit, arranged for performing pulse shaping and noise rejection;

a preamble detection block, coupled to the front end filter, arranged for performing message detection, synchronization, and equalization coefficient estimation; and a decoding module, coupled to the front end filter, arranged for performing equalization, decoding, and error detection;

wherein the message is transmitted outward by the transmitter module through changing the reflected impedance, and the message transmitted by the transmitter module is a message corresponding to usage related to power transfer, so as to affect power transfer control of the receiver module; and wherein a synchronization module in the transmitter module prepends the message with a synchronization sequence having specific codes, and the preamble detection block adjusts timing during a gap between the preamble and message.

35. The receiver module of claim 34, wherein the front end filter comprises of downsampling and pulse shaping filters having a plurality of filters sections.

36. The receiver module of claim 34, wherein the front end filter utilizes a DC removal block to remove DC components of a message.

37. The receiver module of claim 34, wherein the decoding comprises BCH or Hamming decoding.

38. The receiver module of claim 34, wherein the decoding module performs biphase demodulation with error correction.

39. The receiver module of claim 34, further comprising:
a sliding window time correlator or a circular correlator.

40. The receiver module of claim 34, wherein the preamble detection block comprises an Optimized Golay Correlator (OGC) with the noise estimation and DC offset estimation and removal.

41. The receiver module of claim 34, wherein the preamble detection block completes timing adjustments during the gap between the preamble and message to allow the receiver module to receive the message correctly.

42. The receiver module of claim 34, wherein a DC offset of the message is coarsely removed at an analog side of the front end filter and is fine removed at a digital side of the decoding module.

43. A method of performing the operations of a transmitter module in a wireless charging in-band communication system, wherein the wireless charging in-band communication system comprises the transmitter module and a receiver module, the transmitter module performs in-band communication with the receiver module to provide a message to the receiver module, and the method comprises:
- attaching check calculation results of the message to the message to generate an attached result, for message error detection;
- utilizing a modulation module to perform modulation according to the attached result, including performing impedance switching to provide the message to the receiver module by changing reflected impedance seen by the receiver module; and
- utilizing a synchronization module to prepend the message with a synchronization sequence having specific codes;
- wherein the message is transmitted outward by the transmitter module through changing the reflected impedance, and the message transmitted by the transmitter module is a message corresponding to usage related to power transfer, so as to affect power transfer control of the receiver module; and
- the synchronization module provides a gap between the preamble and message, for timing adjustments in the receiver module.

44. The method of claim 43, wherein the check calculation results are generated by performing a CRC calculation on the message.

45. The method of claim 43, further comprising:
performing BCH or Hamming encoding on the attached result.

46. The method of claim 43, wherein the modulation module performs biphase modulation.

47. The method of claim 43, wherein the specific codes comprise Golay complementary codes. prepending the message with a synchronization sequence.

48. A method of performing the operations of a receiver module in a wireless charging in-band communication system, wherein the wireless charging in-band communication system comprises a transmitter module and the receiver module, the receiver module performs in-band communication with the transmitter module to receive a message provided by the receiver module, and the method comprises:
- providing an impedance sensing circuit to detect changes in the reflected impedance of the transmitter module, wherein the message is included by the changes in the reflected impedance;
- providing a front end filter to perform pulse shaping and noise rejection;
- performing message detection, synchronization, and equalization coefficient estimation, comprising adjusting timing during a gap between the preamble and message; and
- performing equalization, channel decoding, and error detection;
- wherein the message is transmitted outward by the transmitter module through changing the reflected impedance, and the message transmitted by the transmitter module is a message corresponding to usage related to power transfer, so as to affect power transfer control of the receiver module; and
- a synchronization module in the transmitter module prepends the message with a synchronization sequence having specific codes, and provides a gap between the preamble and message.

49. The method of claim 48, wherein the front end filter comprises of downsampling and pulse shaping filters having a plurality of filters sections.

50. The method of claim 48, wherein the front end filter utilizes a DC removal block to remove DC components of a message.

51. The method of claim 48, wherein the channel decoding comprises BCH or Hamming decoding.

52. The method of claim 48, further comprising:
performing biphase demodulation with error correction.

53. The method of claim 48, wherein the step of performing message detection, synchronization, and equalization coefficient estimation further comprises:
performing noise estimation and DC offset estimation and removal.

54. The method of claim 48, wherein the step of performing message detection, synchronization, and equalization coefficient estimation further comprises:
completing timing adjustments during the gap between the preamble and message to allow the receiver module to receive the message correctly.

55. The method of claim 48, wherein a DC offset of the message is coarsely removed at an analog side of the receiver module and is fine removed at a digital side of the receiver module.

* * * * *